(12) United States Patent
Miller et al.

(10) Patent No.: US 8,621,473 B2
(45) Date of Patent: Dec. 31, 2013

(54) CONSTRAINED RATE MONOTONIC ANALYSIS AND SCHEDULING

(75) Inventors: Larry James Miller, Black Canyon City, AZ (US); Aaron R. Larson, Shoreview, MN (US); Ryan Lawrence Roffelsen, Tigard, OR (US); Arthur Kirk McCready, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 241 days.

(21) Appl. No.: 13/195,529

(22) Filed: Aug. 1, 2011

(65) Prior Publication Data

US 2013/0036421 A1    Feb. 7, 2013

(51) Int. Cl.
  *G06F 9/46*    (2006.01)
(52) U.S. Cl.
  USPC .......................................... 718/102; 718/103
(58) Field of Classification Search
  None
  See application file for complete search history.

(56) References Cited

U.S. PATENT DOCUMENTS

| | | | |
|---|---|---|---|
| 5,745,778 A | 4/1998 | Alfieri | |
| 6,438,553 B1 | 8/2002 | Yamada | |
| 6,560,628 B1 | 5/2003 | Murata | |
| 6,678,712 B1 * | 1/2004 | McLaren et al. | 718/100 |
| 6,754,690 B2 | 6/2004 | Larson | |
| 6,964,048 B1 * | 11/2005 | Isham | 718/104 |
| 7,107,590 B2 | 9/2006 | Bril et al. | |
| 7,140,022 B2 | 11/2006 | Binns | |
| 7,165,252 B1 | 1/2007 | Xu | |
| 7,302,685 B2 | 11/2007 | Binns | |
| 7,444,638 B1 | 10/2008 | Xu | |
| 7,472,389 B2 | 12/2008 | Smith | |
| 7,681,014 B2 | 3/2010 | Jensen et al. | |
| 7,788,673 B2 | 8/2010 | Bibby | |
| 7,827,551 B2 | 11/2010 | Kulbak | |

(Continued)

FOREIGN PATENT DOCUMENTS

| | | |
|---|---|---|
| WO | 2006004826 | 1/2006 |
| WO | 2009007169 | 1/2009 |
| WO | 2010001353 | 1/2010 |
| WO | 2012005637 | 1/2012 |

OTHER PUBLICATIONS

Bini, "A Hyperbolic Bound for the Rate Monotonic Algorithm", "Proceedings of the 13th Euromicro Conference on Real-Time Systems", Jun. 2001, pp. 1-14, Published in: Delft, The Netherlands.

(Continued)

*Primary Examiner* — Emerson Puente
*Assistant Examiner* — Adam Lee
(74) *Attorney, Agent, or Firm* — Fogg & Powers LLC

(57) ABSTRACT

A method for scheduling schedulable entities onto an execution timeline for a processing entity in a constrained environment includes determining available capacity on the execution timeline for the processing entity based on constraints on the execution timeline over a plurality of time periods, wherein schedulable entities can only be scheduled onto the execution timeline during schedulable windows of time that are not precluded by constraints. The method further includes determining whether enough available capacity exists to schedule a schedulable entity with a budget at a rate. The method further includes when enough available capacity exists to schedule the schedulable entity with the budget at the rate, scheduling the schedulable entity onto the execution timeline for the processing entity during a schedulable window of time. The method further includes when the schedulable entity is scheduled onto the execution timeline, updating available capacity to reflect the capacity utilized by the schedulable entity.

19 Claims, 18 Drawing Sheets

(56) References Cited

U.S. PATENT DOCUMENTS

| | | | |
|---|---|---|---|
| 7,840,966 | B2 | 11/2010 | Dodge |
| 7,844,952 | B2 | 11/2010 | Barsness et al. |
| 7,873,507 | B2 | 1/2011 | Tatsuoka |
| 7,908,604 | B2 | 3/2011 | Takayama |
| 8,036,688 | B2 * | 10/2011 | Oh ............................... 455/466 |
| 8,074,222 | B2 | 12/2011 | Hirai |
| 2001/0023434 | A1 | 9/2001 | Viollet et al. |
| 2002/0120661 | A1 * | 8/2002 | Binns et al. ................... 709/102 |
| 2002/0124043 | A1 * | 9/2002 | Otero Perez et al. ......... 709/107 |
| 2002/0198925 | A1 * | 12/2002 | Smith et al. ................... 709/104 |
| 2003/0069917 | A1 | 4/2003 | Miller |
| 2003/0088606 | A1 | 5/2003 | Miller |
| 2003/0101084 | A1 * | 5/2003 | Otero Perez ...................... 705/8 |
| 2003/0154234 | A1 * | 8/2003 | Larson .......................... 709/107 |
| 2005/0028160 | A1 * | 2/2005 | Cofer et al. ................... 718/100 |
| 2006/0085582 | A1 | 4/2006 | Shikano et al. |
| 2006/0136915 | A1 | 6/2006 | Aingaran |
| 2007/0294384 | A1 | 12/2007 | Nakajima et al. |
| 2008/0028415 | A1 * | 1/2008 | Binns et al. ................... 718/107 |
| 2008/0317026 | A1 * | 12/2008 | Vogl et al. ..................... 370/389 |
| 2009/0031317 | A1 | 1/2009 | Gopalan et al. |
| 2009/0113426 | A1 * | 4/2009 | Mizuno ............................. 718/1 |
| 2009/0158297 | A1 | 6/2009 | Lee |
| 2009/0217280 | A1 | 8/2009 | Miller |
| 2009/0307700 | A1 | 12/2009 | Cazorla Almeida |
| 2010/0131955 | A1 | 5/2010 | Brent et al. |
| 2010/0199280 | A1 | 8/2010 | Vestal |
| 2010/0268912 | A1 | 10/2010 | Conte et al. |
| 2011/0067029 | A1 | 3/2011 | Wolfe et al. |
| 2011/0314476 | A1 * | 12/2011 | Choi ............................. 718/103 |
| 2013/0036423 | A1 | 2/2013 | McCready et al. |

OTHER PUBLICATIONS

Bini, "Schedulability Analysis of Periodic Fixed Priority Systems", "IEEE Transactions on Computers ", Nov. 2004, pp. 1-12, vol. 53, No. 11.

Binns, "A Robust High-Performance Time Partitioning Algorithm: The Digital Engine Operating System (DEOS) Approach", Oct. 18, 2001, pp. 1-12, Publisher: IEEE.

Kato, "A Fixed-Priority Scheduling Algorithm for Multiprocessor Real-Time Systems", "Parallel and Distributed Computing", Jan. 2010, pp. 143-158.

Lehoczky, "The Rate Monotonic Scheduling Algorithm: Exact Characterization and Average Case Behavior", Dec. 7, 1989, pp. 166-171, Publisher: IEEE.

Liu, "Scheduling Algorithms for Multiprogramming in a Hard-Real-Time Environment", "Journal of the Association for Computing Machinery", Jan. 1973, pp. 46-61, vol. 20, No. 1, Published in: US.

McCready, et al., "Systems and Methods for Bounding Processing Times on Multiple Processing Units", U.S. Appl. No. 13/195,503, filed Aug. 1, 2011, 23 Pages.

Paolieri, "Hardware Support for WCET Analysis of Hard Real-Time Multicore Systems", "ISCA '09", Jun. 20-24, 2009, pp. 1-12, Publisher: ACM.

Ramya, "Window Constrained Scheduling of Processes in Real Time CPU Using Multi Objective Genetic Algorithm", "International Journal of Computer Applications (0975-8887)", Feb. 2010, pp. 86-90, vol. 1, No. 21.

Srinivasan, "The Case for Fair Multiprocessor Scheduling", Nov. 2002, pp. 1-18, Publisher: Department of Computer Science University of North Carolina.

Yamada, "Proposal and Evaluation of Apis for Utilizing Inter-Core Time Aggregation Scheduler", "Presented at the 15th Workshop on Job Scheduling Strategies for Parallel Processing (http://www.cs.huji.ac.il/~feit/parsched/jsspp10/p11-yamada.pdf)", Apr. 23, 2010, pp. 1-18.

Yamada, "Proposal and Evaluation of Apis for Utilizing Inter-Core Time Aggregation Scheduler", Oct. 9, 2010, pp. 191-207, vol. 6253, Publisher: Springer-Verlag Berlin Heidelberg.

Yan, "WCET Analysis for Multi-Core Processors With Shared L2 Instruction Caches", "IEEE Real-Time and Embedded Technology and Applications Symposium", Apr. 22, 2008, pp. 80-89, Publisher: IEEE.

"Why multi core processors?", "accessed Feb. 6, 2012", Jun. 13, 2010, pp. 1-3, Publisher.

Easwaran et al., "Systems and Methods for Task Grouping on Multi-Processors", "Filed U.S. Appl. No. 13/367,042", Feb. 6, 2012, pp. 1-38.

Easwaran et al., "Systems and Methods for Instruction Entity Allocation and Scheduling on Multi-Processors", "Filed U.S. Appl. No. 13/665,294", Oct. 31, 2012, pp. 1-66.

European Patent Office, "Office Action", "from Foreign Counterpart of U.S. Appl. No. 13/195,503", Feb. 5, 2013, pp. 1-6, Published in: EP.

European Patent Office, "European Search Report", "from Foreign Counterpart of U.S. Appl. No. 13/195,503", Jan. 24, 2013, pp. 1-4, Published in: EP.

European Patent Office, "Office Action", "from Foreign Counterpart of U.S. Appl. No. 13/195,529", Feb. 13, 2013, pp. 1-7, Published in: EP.

European Patent Office, "European Search Report", "from Foreign Counterpart of U.S. Appl. No. 13/195,529", Feb. 1, 2013, pp. 1-3, Published in: EP.

Cronk, "Improve CPU Utilization with DEOS Slack RTOS Scheduling", Sep. 28, 2009, pp. 1-6.

Feitelson et al., "Distributed Hierarchical Control for Parallel Processing", May 1990, pp. 65-78.

Macariu, "A Model Checking Approach for Multi-core Time Partitions Design", "2010 10th IEEE International Conference on Computer and Information Technology", Jun. 2010, pp. 1910-1917.

Vanderleest, "ARINC 653 Hypervisor", "Digital Avionics Systems Conference 2010", Oct. 2010, pp. 1-20.

U.S. Patent and Trademark Office, "Office Action", "U.S. Appl. No. 13/195,503", Jun. 7, 2013, pp. 1-30.

* cited by examiner

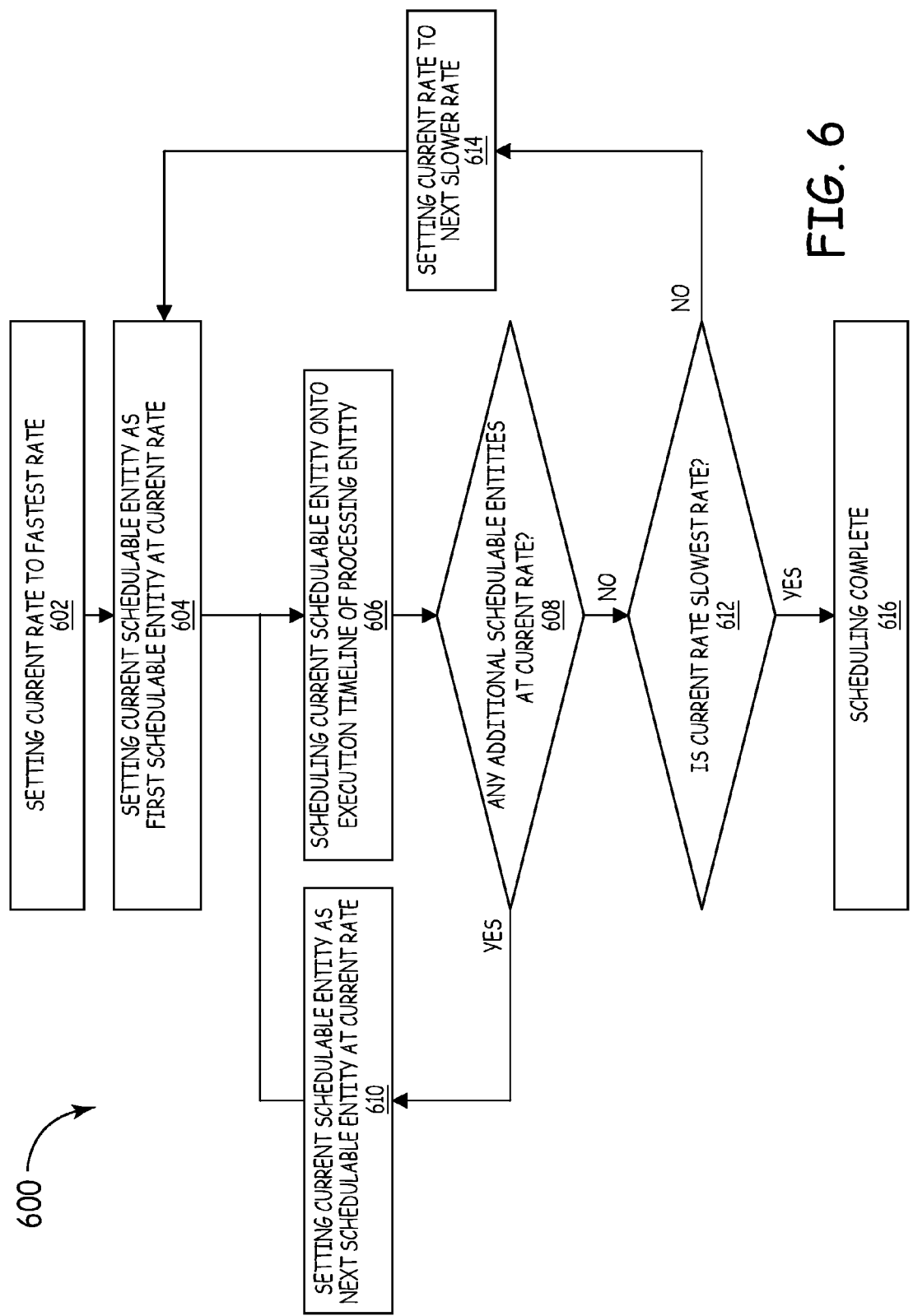

CONSTRAINED RATE MONOTONIC ANALYSIS AND SCHEDULING

BACKGROUND

Rate monotonic analysis (RMA) is a scheduling technique used in real-time operating systems to schedule schedulable entities onto a continuous timeline. Rate Monotonic Scheduling (RMS) provides scheduling guarantees for schedulable entities. In rate monotonic scheduling, schedulable entities each have a rate, indicating how often they repeat. In rate monotonic scheduling, schedulable entities with faster rates are prioritized higher than schedulable entities with slower rates. Thus, schedulable entities with faster rates are scheduled before schedulable entities with slower rates. This also means that schedulable entities with faster rates have shorter periods than schedulable entities with slower rates and thus, will repeat a greater number of times during a major frame.

SUMMARY

The Embodiments of the present invention provide methods and systems for scheduling schedulable entities onto an execution timeline in a constrained environment and will be understood by reading and studying the following specification.

A method for scheduling schedulable entities onto an execution timeline for a first processing entity in a constrained environment includes determining available capacity on the execution timeline for the first processing entity based on constraints on the execution timeline over a plurality of time periods, wherein schedulable entities can only be scheduled onto the execution timeline during schedulable windows of time that are not precluded by constraints. The method further includes determining whether enough available capacity exists to schedule a first schedulable entity with a first budget at a first rate. The method further includes when enough available capacity exists to schedule the first schedulable entity with the first budget at the first rate, scheduling the first schedulable entity onto the execution timeline for the first processing entity during a first schedulable window of time. The method further includes when the first schedulable entity is scheduled onto the execution timeline, updating the available capacity to reflect the capacity utilized by the first schedulable entity.

DRAWINGS

Embodiments of the present invention can be more easily understood and further advantages and uses thereof more readily apparent, when considered in view of the description of the preferred embodiments and the following figures in which.

Figure 5:
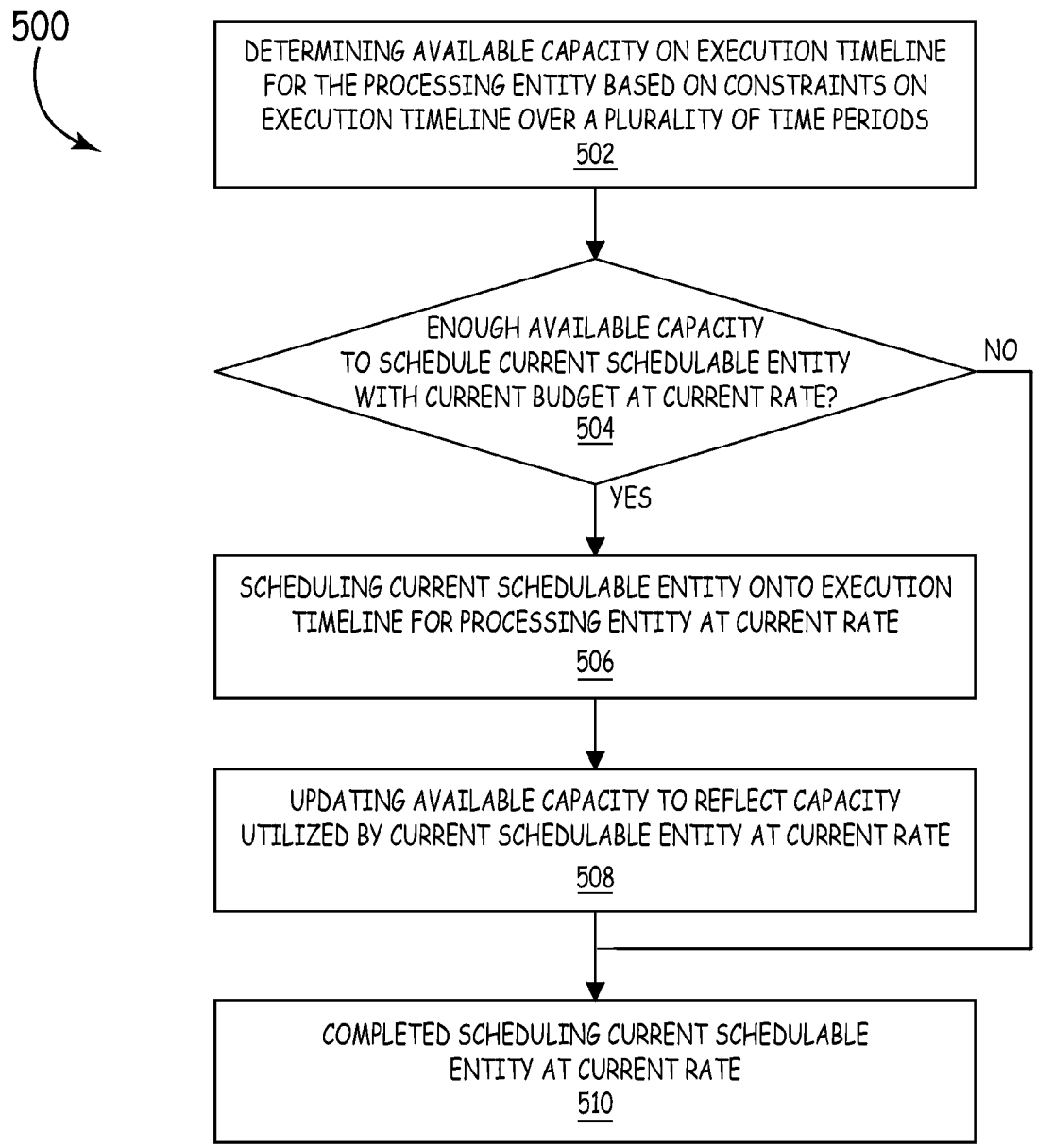

FIG. 5 is a flow chart illustrating a method for performing the schedulabilty analysis of a current schedulable entity at a current rate onto an execution timeline in a constrained environment of one embodiment of the present invention; and FIG. 6 is a flow chart illustrating a method for performing a schedulabilty analysis for a set of multiple schedulable entities at multiple rates onto an execution timeline in a constrained environment of one embodiment of the present invention.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

For the purposes of this description, the following terms will have the following meanings. First, a schedulable entity is a sequence of instructions that is executable by a processing entity. A schedulable entity may be, but is not limited to be, a thread, a task, a process, or a partition. Second, a processing entity is anything capable of processing and executing schedulable entities. A processing entity may be, but is not limited to, a processor, a core of a multi-core processor, and a hyperthread of a hyperthreaded processor. As the term is used in the disclosure, constraint is a period of time in addition to overhead where a scheduler cannot schedule schedulable entities onto an execution timeline. In other words, neither previously scheduled schedulable entities nor overhead are considered constraints. However, the capacity utilized by previously scheduled schedulable entities is still accounted for by updating the available capacity as discussed below.

Current rate monotonic schedulers cannot handle constraints caused by non-continuous execution timelines. Embodiments of the present invention provide systems and methods for scheduling schedulable entities onto an execution timeline in a constrained environment. As discussed above, constraints on the timeline cause certain periods of time to be schedulable while other periods of time are un-schedulable. Thus, constraints preclude scheduling of schedulable entities during non-schedulable windows of time. The schedulable periods of time are called schedulable windows and the phrase constrained rate monotonic scheduling (CRMS) refers to time scheduling within schedulable windows or for schedulable capacities. The schedulable windows within a particular minor frame may not be continuous, though they are shown and described in continuous chunks in the examples below for simplicity. The specific position of a schedulable window within a minor frame is not particularly relevant, but the duration of the schedulable window within a minor frame is relevant. In some embodiments, this duration of the schedulable window is the capacity of the minor frame.

This is accomplished in some embodiments of the present invention using a master scheduler that only allows a constrained rate monotonic scheduler to schedule schedulable entities when permitted by the master scheduler. For example, as explained below, the master scheduler may impose constraints on when the constrained rate monotonic scheduler (or any number of constrained rate monotonic schedulers) can schedule in various ways. In some embodiments of the present invention, the constraints on the timeline are imposed by time partitions created by the master scheduler, such as a hypervisor, that allocates some slices of the timeline to a first operating system and other slices of the timeline to a second operating system. Thus, while both operating systems can run on the same processing entity, each operating system can only schedule schedulable entities during the slices of the timeline it is allocated by the master scheduler. In other embodiments of the present invention, the constraints on the timeline are imposed on timelines running on slave processing entities based on when schedulable entities are running on a master processing entity. Specifically, the scheduler will only allow specific schedulable entities to be scheduled onto the slave processing entities while certain other schedulable entities are running on the master processing entity. In some embodiments, the schedulable entities scheduled to run on the master processing entity dictate various execution groups. These execution groups only allow certain schedulable entities that are defined by the execution group to run on the slave processing entity while the execution group is active. A particular execution group is active while schedulable entities in the particular group are executing on the master processing entity. Thus, the active execution group is driven by the particular schedulable entities executing on the master processing entity. The time during which each execution group is active defines the constraints on the timeline as a constrained rate monotonic analysis (CRMA) domain. In some embodiments, only a first set of tasks can be scheduled during a first CRMA domain dictated by a first execution group, while a second set of tasks can be scheduled during a second CRMA domain dictated by a second execution group. Each CRMA domain has one or more associated windows which may be either fixed in the timeline or constrained to occur anytime within a defined interval in the timeline. It is understood that greater quantities of execution groups, CRMA domains, and sets of tasks can also be implemented. The embodiments described below will describe various ways in which the constraints on the timeline can be imposed.

Some embodiments of the present invention utilize rate monotonic scheduling (RMS) based on rates, where schedulable entities having the highest rates (and thus, the shortest periods) are scheduled first and then schedulable entities having the next highest rates. The rate monotonic scheduling continues to schedule through all the rates until reaching the slowest rate (and thus, the longest period). In some embodiments implementing harmonic rate monotonic scheduling, the period of the fastest rate of schedulable entities in a rate monotonic scheduled system generally dictates the minor frame. Similarly, in some embodiments implementing harmonic rate monotonic scheduling, the period of the slowest rate schedulable entities in a rate monotonic scheduled system generally dictates the major frame. In some embodiments, such as embodiments implementing non-harmonic rate monotonic scheduling, the minor frame and major frame are dictated in other ways.

While this description focuses on embodiments using constrained rate monotonic scheduling, it is understood that similar techniques could apply to other types of scheduling that have predetermined sets of rules regarding how schedulable entities are scheduled onto execution timelines.

This description describes systems and methods for scheduling schedulable entities onto an execution timeline in a constrained environment generally. It is understood that in some embodiments, the systems and methods described herein can be implemented in Integrated Modular Avionics (IMA) systems involving a number of computers that are performing avionics functions and are communicating with one another through a backplane, bus, or network. The individual computers in an IMA system are configured to communicate with one another. Computers in an IMA running applications produce data that is typically subsequently read by applications running on other computers in the IMA. It is understood that in some embodiments, the systems and methods described herein can be implemented in other avionics systems and computers utilized on-board aircraft. It is understood that in some embodiments, the systems and methods described herein are implemented in other real-time operating systems to schedule schedulable entities onto a continuous timeline.

Figure 1:
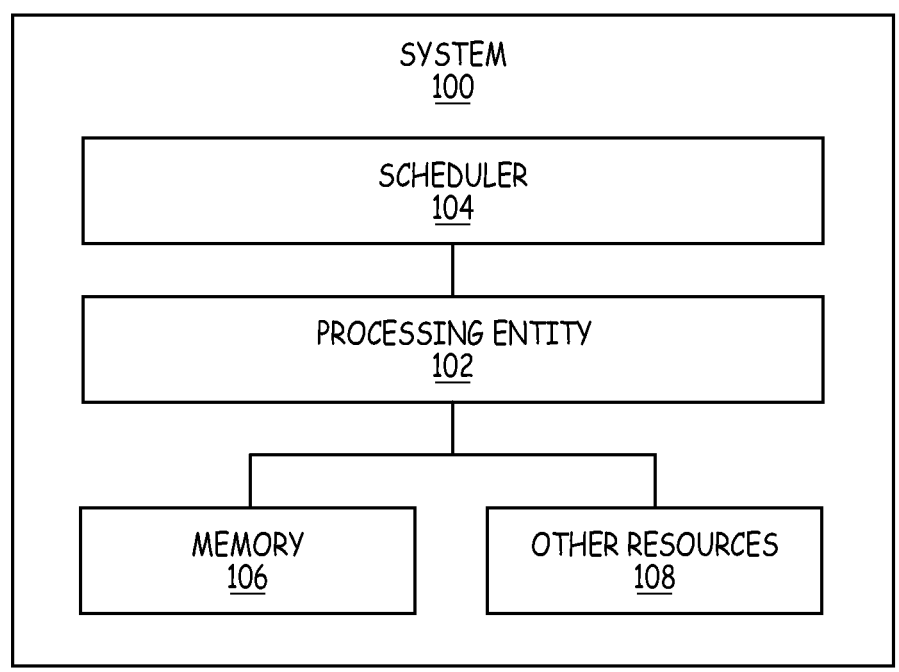
FIG. 1 is a block diagram of a system for scheduling schedulable entities onto an execution timeline in a constrained environment of the present invention.

FIG. 1 is a block diagram of a system 100 for scheduling schedulable entities onto an execution timeline in a constrained environment of one embodiment of the present invention. The system 100 of FIG. 1 includes a processing entity 102 coupled to a scheduler 104, a memory 106, and other resources 108. The processing entity 102 is communicatively coupled to the scheduler 104, the memory 106, and the other resources 108. In some embodiments, the system 100 is component of an IMA system or an avionics computer.

Processing entity 102 is a processor such as, but not limited to a core in a multi-core processor, or a hyperthread in a hyperthreaded processor. The scheduler 104 is implemented, for example as a separate piece of hardware, a piece of software running on the processing entity 102, or another processing entity resident on-board or external to the system 100.

The memory 106 is a physical memory storage device such as, but not limited to, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. In some embodiments, the execution of the program instructions stored on memory 106 by processing entity 102 causes instantiation of at least one schedulable entity.

The other resources 108 of the system 100 are any other resources that are directly or indirectly communicatively coupled to the processing entity 102 such as, but not limited to other types of memory, data storage devices, input/output ports, and human/machine interfaces. The other resources 108 are configured to communicate with or be controlled by the processing entity 102.

In the embodiment shown in FIG. 1 in operation, scheduler 104 performs the function of scheduling the execution of schedulable entities by processing entity 102 using constrained rate monotonic analysis scheduling ("CRMA scheduling"). CRMA scheduling is used when there is some sort of constraint on the execution timeline, meaning that some of the time on the timeline is un-schedulable by the scheduler and other time is schedulable in "schedulable windows" of time. Various constraints contribute to the creation of the non-schedulable windows of time 203, such as (1) constraints on when a slave processing entity can execute schedulable entities based on when schedulable entities are executing on a master processing entity; and (2) constraints on when a particular operating system can schedule schedulable entities onto the timeline. What creates the constraints on the timeline is not necessarily relevant to the analysis.

As an example, one implementation that addressed the first type of constraint would provide CRMA scheduling of schedulable entities where the execution of any schedulable entities on processing entity 102 is only permitted during windows of time allocated to a first operating system by a hypervisor. An extension of this example implementation would be where other windows of time, not available for scheduling of schedulable entities of the first operating system of processing entity 102, are allocated to the scheduling of schedulable entities for the second operating system by the hypervisor. In other implementations, additional operating systems are allocated scheduling time during other windows of time.

In an implementation where processing entity 102 is a slave processor in a multi-processor system, execution of schedulable entities on the processing entity 102 (slave processor) is only permitted when schedulable entities are executing on an associated master processing entity (such as a master processor, a master core, or a master hyperthread) in the multi-processor system. In an implementation where processing entity 102 is a slave core in a multi-core system, execution of schedulable entities on the processing entity 102 (a slave core) is only permitted when schedulable entities are executing on an associated master processing entity (such as a master processor, a master core, or a master hyperthread) in the multi-core system. In an implementation where processing entity 102 is a slave hyperthread for a processor, execution of schedulable entities on the slave entity (slave hyperthread) is only permitted when schedulable entities are executing on an associated master processing entity (such as a master processor, a master core, or a master hyperthread).

It is also understood that these implementations could be combined to create other implementations, such as where execution of any of a plurality of slave schedulable entities, including slave cores, processors, and hyperthread, is only permitted while schedulable entities are executing on a master processing entity, such as a master core, processor, or hyperthread of processing entity 102. One having ordinary skill in the art would understand that various combinations of processors, cores, and hyperthreads can be created according to this disclosure.

FIGS. 2A-2E are diagrams illustrating an example of a constrained execution timeline diagram 200 in a constrained environment of the present invention, where schedulable windows of time 201 are constrained by non-schedulable windows of time 203 (represented by regions with slashed lines). Each of FIGS. 2A-2E shows a different stage in a scheduling process, from FIG. 2A where no schedulable entities have been scheduled to FIG. 2E where a plurality of schedulable entities have been scheduled. In one embodiment, scheduling of the constrained execution timeline diagram 200 illustrated by FIGS. 2A-2E is managed by the scheduler 104 illustrated in FIG. 1.

Figure 2A:
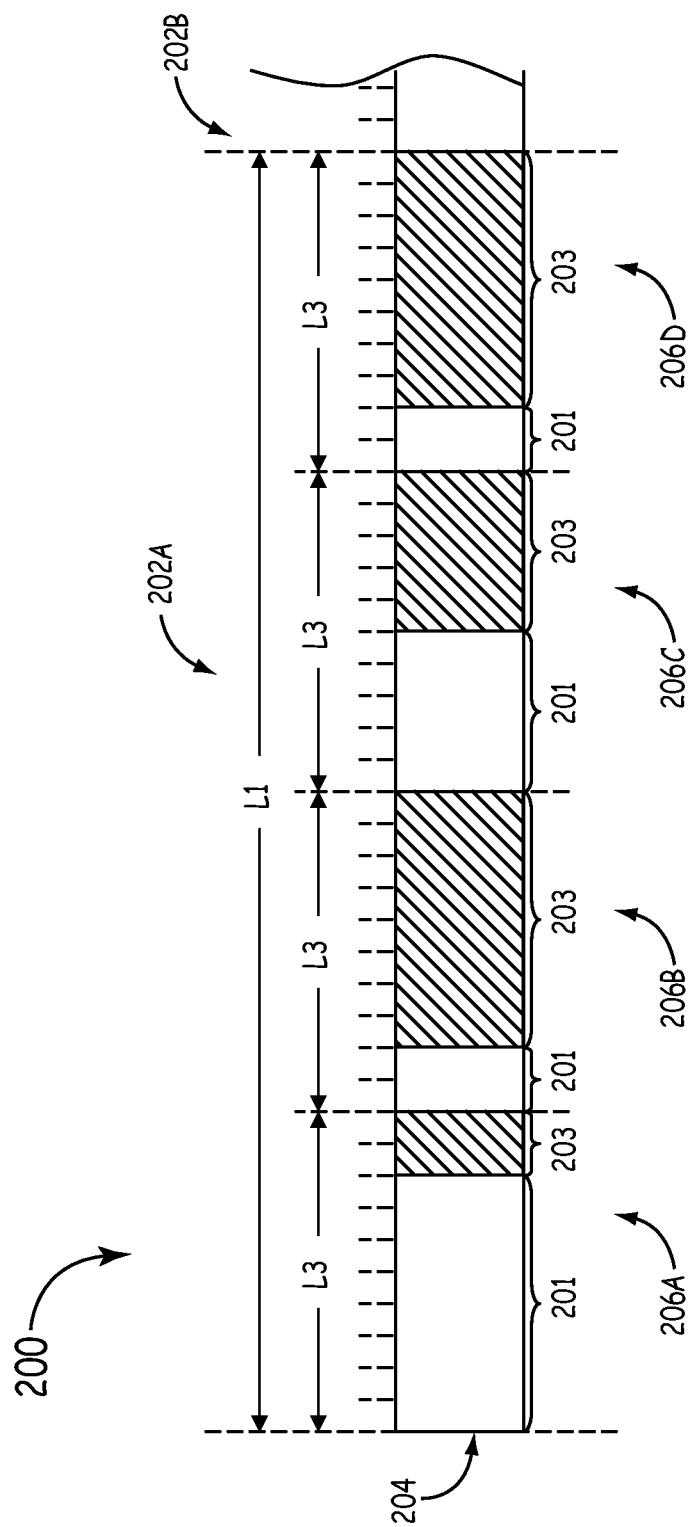
FIG. 2A-2E are diagrams of an example constrained execution timeline in a constrained environment of the present invention.

FIG. 2A shows the example execution timeline diagram 200 in a constrained environment of the present invention without any schedulable entities scheduled. The execution timeline diagram is divided up into major frames 202, such as major frame 202A and the portion of major frame 202B shown in FIG. 2A. The duration/length of each major frame 202 (such as major frame 202A and 202B) is defined by length L1. Each major frame represents the time interval over which everything is scheduled. The duration of each major frame 202 is defined as the period of the slowest rate schedulable entity of the system. The major frame 202 repeats as major frame 202A, 202B, etc. until the system shuts down.

In the implementation illustrated in FIG. 2A, each major frame 202 is further divided into minor frames 206, such as minor frame 206A, minor frame 206B, minor frame 206C, and minor frame 206D. In these implementations, each minor frame 206 is a sub-part of a major frame 202. The duration/length of each minor frame (such as minor frame 206A, minor frame 206B, minor frame 206C, and minor frame 206D) is defined by length L3. As would be appreciated by one of ordinary skill in the art upon reading this specification, some industry standards recognize minor frames while others do not. Thus, the inclusion of minor frames is therefore optional and in other implementations there are no minor frames. The duration of the minor frame 206 is defined as the period of the fastest rate schedulable entity of the system. If the minor frame 206 is present, the major frame 206 is a multiple of the minor frame. As would be appreciated by one of ordinary skill in the art upon reading this specification, in synchronous systems where the clocks in the different computers are synchronized or can be synchronized, there is often a notion of a heart-beat interval on which synchronization occurs between the clocks. For such systems, this interval is addressed by the minor frame 206. The minor frame 206 is often the fastest rate at which the system can produce data. Each minor frame 206 of the system 100 has a shorter period than a major frame 202 of the system.

In some implementations, each minor frame 206 of the system 100 is harmonically related to a major frame 202 of the system, such that the major frame 202 period is a multiple of the minor frame 206 period and a plurality of minor frames 206 fit into a single major frame 202 evenly. In some implementations utilizing a harmonic rate CRMA scheduler at scheduler 104, every rate available for scheduling schedulable entities is a multiple of a slower rate, except for the lowest rate available, which is the major frame rate. Thus, each rate in a harmonic rate CRMA scheduler is a multiple of the next lowest rate, starting at the lowest available rate which equals the major frame rate and going up through the minor frame rate, which is the fastest available rate. For example, the execution timeline 204 of the example constrained execution timeline diagram 200 includes a major frame 202 that repeats at a rate of 25 Hz and the minor frame repeats at a rate of 100 Hz, allowing schedulable entities of a harmonic rate CRMA scheduler to schedule at rates of 100 Hz, 50 Hz, and 25 Hz. In other embodiments, there is a larger difference between the rate of the minor frame and the major frame and more distinct harmonic rates are available to the harmonic rate CRMA scheduler. In other implementations, the CRMA scheduler is non-harmonic rate and the systems and methods of this description are adapted to work with non-harmonic rates.

While FIG. 2A shows four minor frames 206 in a single major frame 202, other implementations have different ratios of minor frames to major frames. It is understood that various implementations with different durations of major frame and minor frame can be implemented without departing from the scope of the claims described below.

As mentioned above, execution timeline 204 includes non-schedulable periods of time 203 shown by the regions with dashed lines. Other periods of time in timeline 204 are schedulable on the processing entity 102, with the exception of potential periods of time used for overhead processing in the system 100, such as overhead time between minor frames 206 and overhead time between major frames 202. The overheads are ignored for simplicity, but could be due to processor cache effects and the runtime overhead of the scheduling algorithm itself. The overheads for CRMA systems might be a function of the number of windows within each CRMA period. More constraints on the execution timeline 204 caused by non-schedulable periods of time 203 contribute to additional overhead. While the other periods of time in the timeline 204 may be schedulable, they may not be available for scheduling if another schedulable entity is already scheduled in a particular period of time.

Non-schedulable periods 203 of time are not necessarily the same duration between minor frames 206 or between major frames 202. In addition, in some implementations, the non-schedulable periods of time are not at the end of each minor frame 206 and are instead interspersed within each minor frame 206. Thus, it is understood that the exact placement and cause of the non-schedulable periods of time 203 is not relevant to the systems and methods described herein. It is enough that the system 100 knows where the non-schedulable periods of time 203 are located along the execution timeline 204.

Schedulable entities each have rates associated with them. The rate of a particular schedulable entity dictates the periodicity of the schedulable entity. While periodicity indicates that the schedulable entity repeats every period, it does not necessarily mean that the schedulable entity repeats at the exact same time during each period. Thus, a schedulable entity that has a period that spans two minor frames may be scheduled at the beginning of the first minor 206A frame to fulfill its requirement of being scheduled during the first instance of its period that spans the first minor frame 206A and the second minor frame 206B, but it may not be scheduled again until the end of the third minor frame 206C or in the fourth minor frame 206D to fulfill its requirement of being scheduled during the second instance of its period that spans the third minor frame 206C and the fourth minor frame 206D. The actual position on the timeline of a scheduled schedulable entity depends on the position on the timeline of other schedulable entities scheduled before it, including faster rate schedulable entities, same-rate schedulable entities scheduled prior, and asynchronous service requests (such as interrupt service requests).

An execution timeline for a processing entity has a budget capacity $C[r]$ at each rate. The budget capacity is an indication of the maximum amount of time available to schedule schedulable entities at a particular rate across a major frame. This budget capacity is initially only limited by the constraints of the non-schedulable time periods on the major frame of the timeline, but once schedulable entities begin to be scheduled onto the major frame of the timeline, the budget capacity is adjusted accordingly to account for the additional non-schedulable time periods created by the scheduling of prior schedulable entities. For example, FIG. 2A shows several periods of non-schedulable windows of time 203 in the major frame 202A. While the non-schedulable windows of time 203 are in each of the minor frames 206A, 206B, 206C, and 206D shown in FIG. 2A, in other embodiments the non-schedulable windows of time 203 are in fewer than all of the minor frames 206 within the major frame 202A.

In some implementations, a set of CRMA rates $R[i]$ are supported by a system, indexed by i. The set of CRMA rates R is ordered from highest rate to lowest, such that the rate $R[1]$ at index 1 of the system is a faster rate than the rate $R[2]$ at index 2 of the system. The set of rates R is harmonic and is either described in terms of frequency or period. In these implementations, the budget capacity of a processing entity is expressed as a ratio indicating the amount of time available for scheduling schedulable entities onto the processing entity divided by the total duration in time of the period defining the rate of the particular schedulable entity. For example, if a rate $R[1]$ from the set R were defined by a ten milliseconds period $P[1]$ and there are three milliseconds of time available within the rate, then the capacity at the rate $R[1]$ could be expressed as $C[1]=0.3$ or 30% capacity at rate $R[1]$. In some implementations, the set of rates R includes no unassigned rates, such that each available rate in the harmonic set of rates R is used by at least one schedulable entity. In other implementations, there may be some unassigned rates.

In continuous time models implementing traditional harmonic rate monotonic scheduling, the capacity at the slower rate will be equal to the capacity at the faster rate, such that $C[r]=C[r+1]$ represents the relationship between a faster rate $C[r]$ and a slower rate $C[r+1]$. This is true because there are no constraints on the time-line cause by non-schedulable windows of time 203. In contrast, in a discontinuous model implementing CRMA according to the embodiments described herein, the capacity at a slower rate will always be greater than or equal to a capacity at a faster rate, such that $C[r] \leq C[r+1]$ represents the relationship between a faster rate $C[r]$ and a slower rate $C[r+1]$. Faster rate schedulable entities will be generally more difficult to schedule because they will require a certain time budget be available across more numerous and shorter periods of time than slower rate schedulable entities and the non-schedulable time periods are more likely to impact the capacity at a faster rate than a slower rate.

Specifically, in the implementation of the execution timeline diagram 200 shown in FIG. 2A, each major frame 202 has a duration D1 of 40 milliseconds and each minor frame 206 has a duration D3 of 10 milliseconds. The non-schedulable window of time 203 in the first minor frame 206A is two milliseconds long. The non-schedulable window of time 203 in the second minor frame 206B is eight milliseconds long. The non-schedulable window of time 203 in the third minor frame 206C is five milliseconds long. The non-schedulable window of time 203 in the fourth minor frame 206D is eight milliseconds long.

In some implementations, a first rate $R[1]=100$ Hz, a second rate $R[2]=50$ Hz, and a third rate $R[3]=25$ Hz. At the first rate $R[1]$, only two milliseconds are available on the execution timeline 204 during a single period of 10 milliseconds because the rate $R[1]=100$ Hz would require scheduling execution of the schedulable entities for an allotted budget in each of first minor frame 206A, second minor frame 206B, third minor frame 206C, and fourth minor frame 206D. At the first rate $R[1]$, the period is equal to the duration of a minor frame (length L3). There are only two milliseconds available in both second minor frame 206B and fourth minor frame 206D. Thus, the capacity $C[1]=0.2$ (or 20%) at the first rate of 100 Hz because there are only two milliseconds guaranteed to be available during each of the 10 millisecond periods.

At the second rate $R[2]$, only seven milliseconds are available on the execution timeline during a single period of 20 milliseconds because the rate $R[2]=50$ Hz would require scheduling execution of schedulable entities for an allotted budget during both (1) a first period spanning the first minor frame 206A and the second minor frame 206B; and (2) a second period spanning the third minor frame 206C and the fourth minor frame 206D. At the second rate $R[2]$, the period is equal to the twice the duration of a minor frame (length L3). There are only seven milliseconds available in the second period spanning the third minor frame 206C and the fourth minor frame 206D. Thus, the capacity $C[2]=0.35$ (or 35%) at 50 Hz because there are seven milliseconds guaranteed to be available during each of the 20 millisecond periods.

At the third rate $R[3]$, 17 milliseconds are available on the execution timeline during a single period of 40 milliseconds because the rate $R[3]=25$ Hz would require scheduling execution of schedulable entities for an allotted budget during a single period spanning the entire major frame 202A (including all of the first minor frame 206A, the second minor frame 206B, the third minor frame 206C, and the fourth minor frame 206D). At the third rate $R[3]$, the period is equal to four times the duration of the minor frame (length L3), which is the duration of the major frame (length L1). There are 17 milliseconds available in the period spanning the entire major frame. Thus, the capacity C[3]=0.425 (42.5%) at 25 Hz because there are 17 milliseconds guaranteed to be available during each the 40 millisecond period.

The examples above, shows how C[1]≤C[2]≤C[3] because C[1]=0.2, C[2]=0.35, and C[3]=0.425 and 0.2≤0.35≤0.425. The relationship C[r]≤C[r+1] in the CRMA systems and methods will be further described with reference to FIGS. 2A-2E and FIGS. 4A-4I below.

Thus, it can be determined whether a schedulable entity is schedulable on the execution timeline 204 based on its rate (and thusly its period), necessary budget, and the budget capacity. If a particular schedulable entity is not schedulable because there is not enough budget capacity available at the schedulable entity's rate, then the system can determine if any other schedulable entities at the same rate or slower rates are schedulable. In traditional harmonic-rate rate monotonic systems, schedulable entities are schedulable as long as the utilization of all the schedulable entities does not exceed 1.00 (100%).

In contrast for CRMA, the schedulability determination occurs individually by rate, starting with the highest rate (with the shortest period) and going down to the lowest rate (with the longest period). Thus a system is schedulable if the utilization of schedulable entities is less than the capacity for each rate given, where the utilization of faster rate schedulable entities is subtracted from the available capacity when the schedulability analysis is performed for the next schedulable entity.

FIGS. 2B-2E show the execution timeline 204 as it is being scheduled, where schedulable entity T1 is scheduled first, followed by schedulable entity T2, then schedulable entity T3, and finally schedulable entity T4.

Figure 2B:
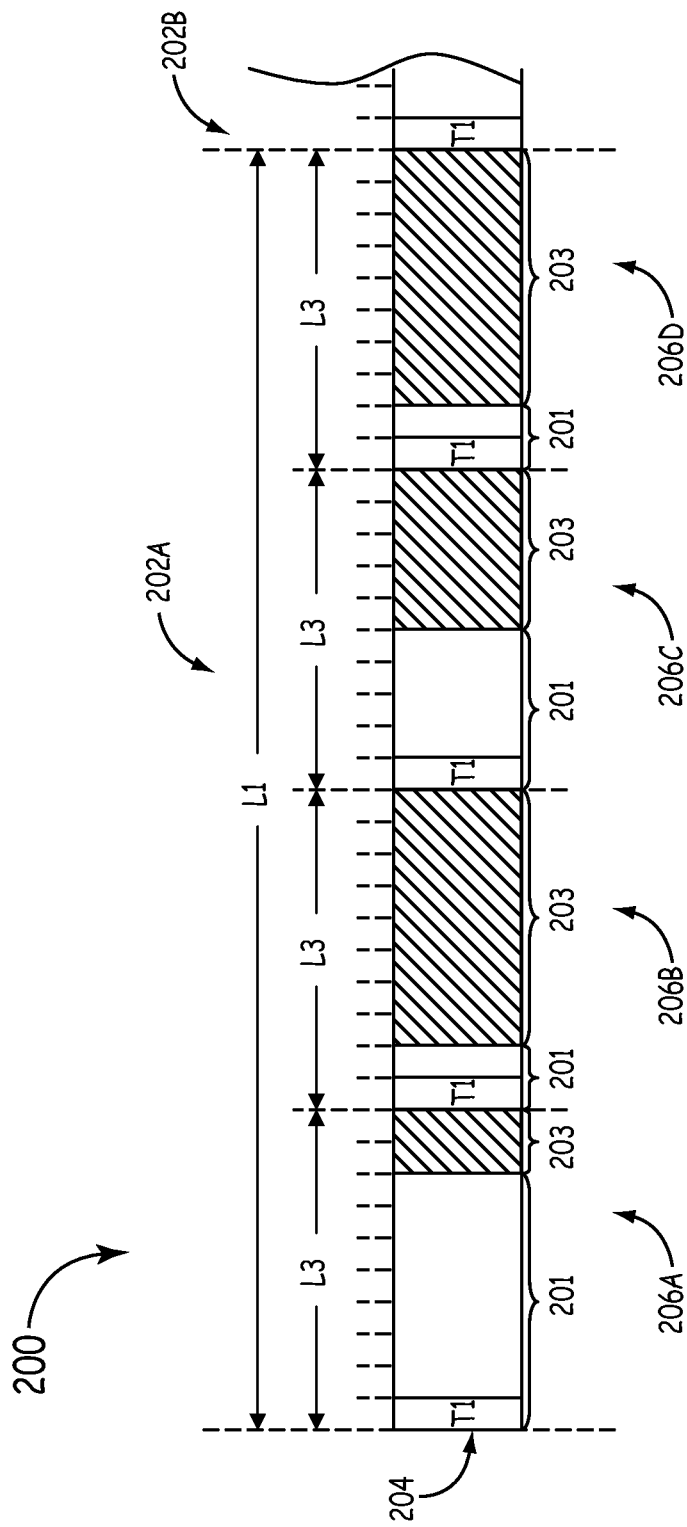

FIG. 2B shows the execution timeline 204 after schedulable entity T1 has been scheduled. Schedulable entity T1 has a rate of 100 Hz, a period of 10 milliseconds, and a budget of one millisecond. Thus, if schedulable entity T1 is scheduled, it will execute for a total of one millisecond during a period spanning one minor frame (where the period has a total duration equal to the minor frame length L3=10 milliseconds). Thus, before any schedulable entities are scheduled onto the execution timeline 204 as shown in FIG. 2A, the schedulable entity T1 has a maximum guaranteed budget of two milliseconds because there are only two milliseconds in the fourth minor frame 206D that are schedulable because the non-schedulable window of time 203 in the fourth minor frame 206D takes eight of the 10 milliseconds available. This is true even though there is more time available in the other minor frames 206A and 206C. Schedulable entity T1 only needed to use a budget of one millisecond in each of the minor frames 206 and was thus schedulable and was scheduled as shown in FIG. 2B. While execution of schedulable entity T1 is scheduled at the beginning of each minor frame 206A, 206B, 206C, and 206D in FIG. 2B, in other implementations, the execution is spread through each minor frame 206. This may be the case if an asynchronous event (such as an interrupt service request) preempts execution of schedulable entity T1. After the interrupt service request is serviced, the execution of schedulable entity T1 continues. While the CRMA scheduling guarantees that schedulable entity T1 will execute for a total of one millisecond in each minor frame 206, it does not necessarily guarantee when, during each minor frame, schedulable entity T1 is scheduled.

Figure 2C:
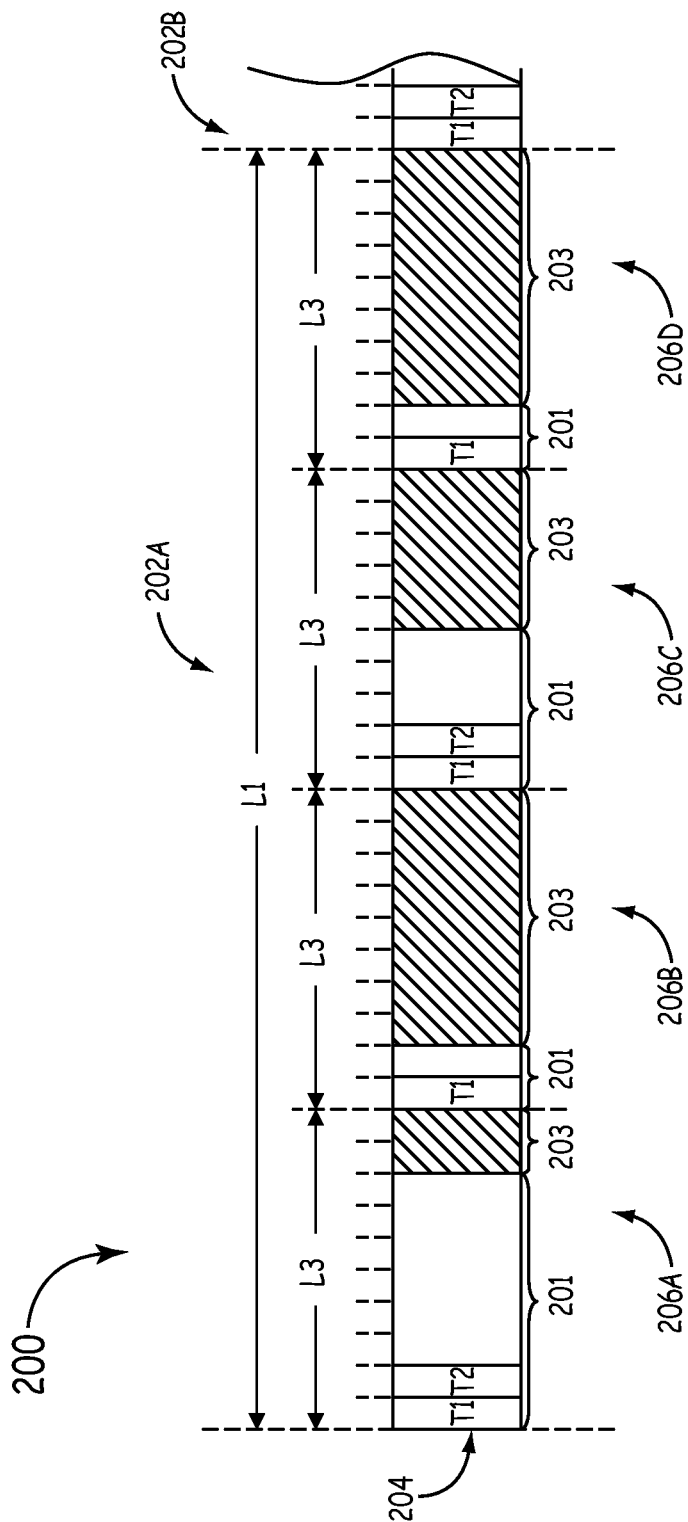

FIG. 2C shows the execution timeline 204 after schedulable entities T1 and T2 have been scheduled. Schedulable entity T2 has a rate of 50 Hz, a period of 20 milliseconds, and a budget of one millisecond. Thus, if schedulable entity T2 is scheduled, it will execute for a total of one millisecond during a period spanning two minor frames. Thus, if scheduled, schedulable entity T2 executes (1) during a first period spanning minor frames 206A and 206B for a total of one millisecond (where the first period has a total duration of 20 milliseconds, which is two times minor frame length L3=10 milliseconds); and (2) during a second period spanning minor frames 206C and 206D for a total of one millisecond (where the second period has a total duration of 20 milliseconds, which is two times minor frame length L3=10 milliseconds). Thus, after schedulable entity T1 is scheduled onto the constrained execution timeline 204 as shown in FIG. 2B, the schedulable entity T2 has a maximum guaranteed budget of five milliseconds because there are only five milliseconds available between the third minor frame 206C and the fourth minor frame 206D. Specifically, there are only four milliseconds available in the third minor frame 206C and one millisecond available in the fourth minor frame 206D for a combined total of five milliseconds. Even though there are eight milliseconds available between the first minor frame 206A (seven milliseconds) and the second minor frame 206B (one millisecond), there is not eight milliseconds available between the third minor frame 206C and the fourth minor frame 206D, and thus an eight millisecond budget cannot be guaranteed at 50 Hz. Thus, only the five millisecond budget can be guaranteed at 50 Hz. Schedulable entity T2 only needed to use a budget of one millisecond in each of its periods (the first spanning minor frames 206A and 206B and the second spanning minor frames 206C and 206D). Thus, schedulable entity T2 was schedulable and was scheduled as shown in FIG. 2C. As with execution of schedulable entity T1 above, the exact placement of execution of schedulable entity T2 within its period is not set and it does not necessarily need to come immediately after schedulable entity T1 and may be spread through its period.

Figure 2D:
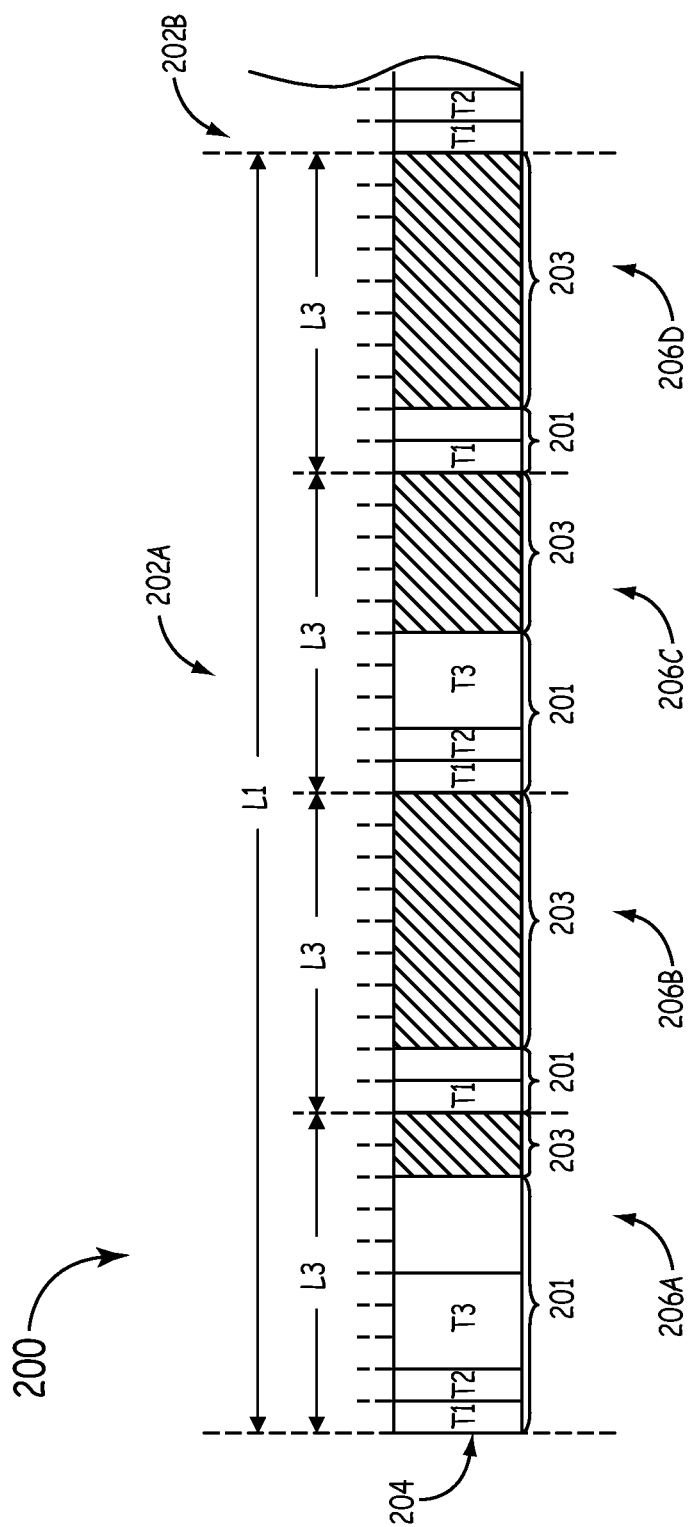

FIG. 2D shows the execution timeline 204 after schedulable entities T1, T2, and T3 have been scheduled. Schedulable entity T3 has a rate of 50 Hz, a period of 20 milliseconds, and a budget of three milliseconds. Thus, if schedulable entity T3 is scheduled, it will execute for a total of three milliseconds during a period spanning two minor frames. Thus, if scheduled, schedulable entity T3 executes (1) during a first period spanning minor frames 206A and 206B for a total of three milliseconds (where the first period has a total duration of 20 milliseconds, which is two times the minor frame length L3=10 milliseconds); and (2) during a second period spanning minor frames 206C and 206D for a total of three milliseconds (where the second period has a total duration of 20 milliseconds, which is two times the minor frame length L3=10 milliseconds). Thus, after schedulable entities T1 and T2 are scheduled onto the constrained execution timeline 204 as shown in FIG. 2C, there are only four milliseconds available to schedule execution entities at 50 Hz because there are only four milliseconds available between the third minor frame 206C and the fourth minor frame 206D. Specifically, there are only three milliseconds available in the third minor frame 206C and one millisecond available in the fourth minor frame 206D for a combined total of four milliseconds. Even though there are seven milliseconds available between the first minor frame 206A (six milliseconds) and the second minor frame 206B (one millisecond), there is not seven milliseconds available between the third minor frame 206C and the fourth minor frame 206D, and thus a seven millisecond budget cannot be guaranteed at 50 Hz. Thus, only the four millisecond budget can be guaranteed at 50 Hz. Schedulable entity T3 only needed to use a budget of three milliseconds in each of its periods (the first spanning minor frames 206A and 206B and the second spanning minor frames 206C and 206D). Thus, schedulable entity T3 was schedulable and was scheduled as shown in FIG. 2D. As with execution of schedulable entities T1 and T2 above, the exact placement of execution of schedulable entity T3 within its period is not set and it does not necessarily need to come immediately after schedulable entity T1 or T2 and may be spread through its period.

Figure 2E:
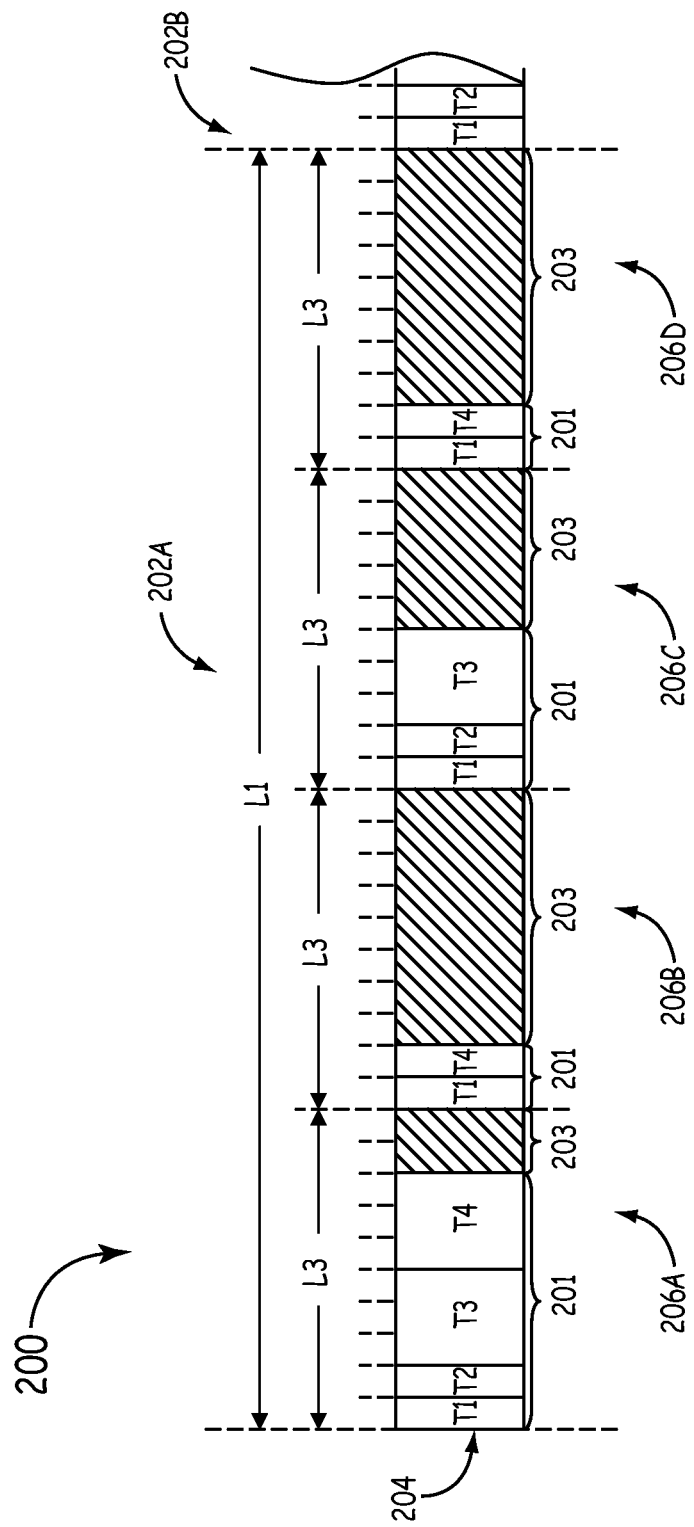

FIG. 2E shows the execution timeline 204 after schedulable entities T1, T2, T3, and T4 have been scheduled. Schedulable entity T4 has a rate of 25 Hz, a period of 40 milliseconds, and a budget of five milliseconds. Thus, if schedulable entity T4 is scheduled, it will execute for a total of five milliseconds during a period spanning four minor frames (which is equal to one major frame). Thus, if scheduled, schedulable entity T4 executes during a first period spanning minor frames 206A, 206B, 206C, and 206D for five milliseconds (where the first period has a total duration of 40 milliseconds, which is four times the minor frame length L3=10 milliseconds and equal to the major frame length L1=40 milliseconds). Thus, after schedulable entities T1, T2, and T3 are scheduled onto the constrained execution timeline 204 as shown in FIG. 2D, the schedulable entity T4 has a maximum guaranteed budget of five milliseconds because there are only five milliseconds available in the aggregate during the minor frames 206A, 206B, 206C, and 206D. Specifically, there are only three milliseconds available in the first minor frame 206A, one millisecond available in the second minor frame 206B, zero milliseconds available in the third minor frame 206C, and one millisecond available in the fourth minor frame 206D for a combined total of five milliseconds. Thus, only the five millisecond budget can be guaranteed at 25 Hz. Schedulable entity T4 only needed to use a budget of five milliseconds in each of its periods. Thus, schedulable entity T4 was schedulable and was scheduled as shown in FIG. 2E. While there is no available budget remaining in the example shown in FIG. 2E, as with execution of schedulable entities T1, T2, and T3 above, the exact placement of execution of schedulable entity T4 within its period is not set and it does not necessarily need to come immediately after schedulable entity T1, T2, or T3 and may be spread through its period.

FIG. 2A-2E show a coherent example of scheduling schedulable entities on an execution timeline 204. In other example implementations, certain schedulable entities may not be schedulable at a particular rate for a particular time budget. In these implementations, the scheduler may just move to another schedulable entity to see if it is schedulable or it may create an error condition indicating that the schedulable entity is not schedulable as desired. In some implementations, a schedulability analysis is performed before run-time to determine whether or not a particular set of schedulable entities are schedulable onto the constrained execution timeline 204. In some implementations, the schedule is predetermined before run-time and the schedulability analysis can be used to decide whether or not a particular set of schedulable entities configured at desired rates and time budgets is schedulable or not.

Figure 3:
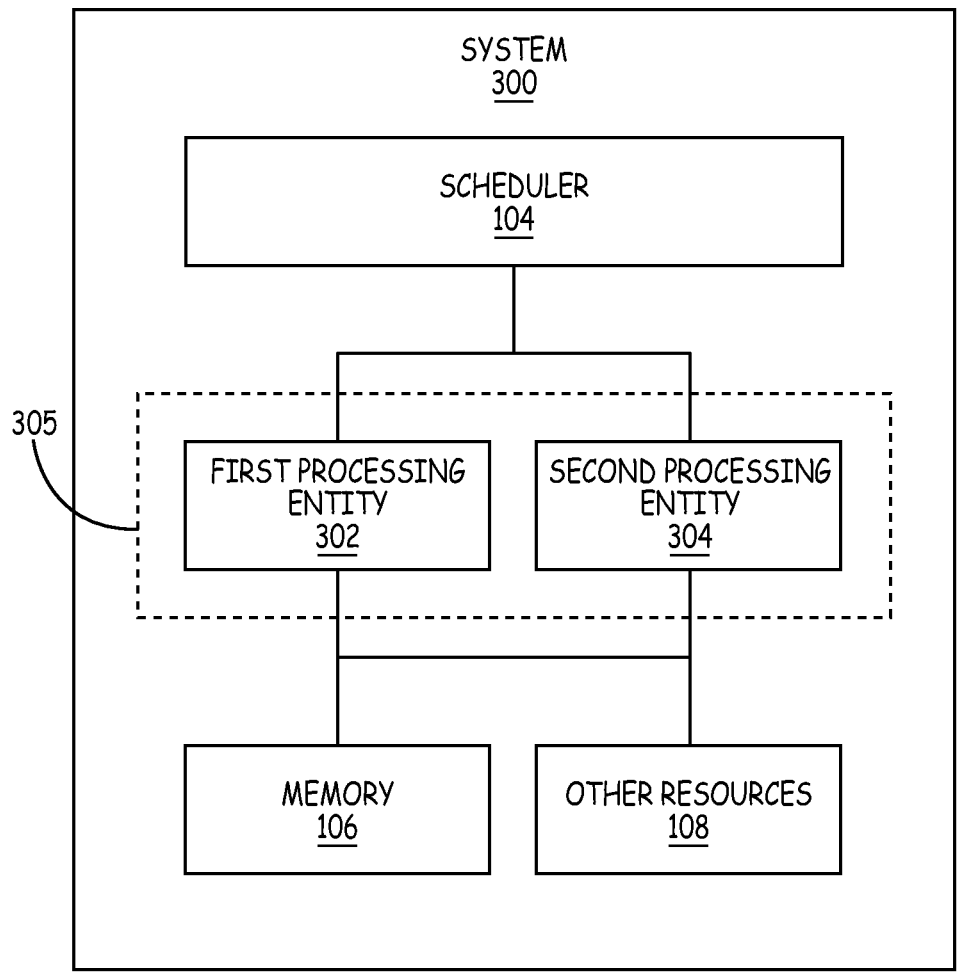
FIG. 3 is a block diagram of another system for scheduling schedulable entities onto an execution timeline in a constrained environment of the present invention.

FIG. 3 is a block diagram of a system 300 for scheduling schedulable entities onto an execution timeline in a constrained environment of one embodiment of the present invention. The system 300 of FIG. 3 includes a first processing entity 302 coupled to a second processing entity 304, a scheduler 104, a memory 106, and other resources 108. Processing entity 302 and processing entity 304 each include a processor, a core in a multi-core processor, or a hyperthread in a hyperthreaded processor. In some implementations, processing entity 302 is a master processing entity and processing entity 304 is a slave processing entity. Processing entity 302 and processing entity 304 are both communicatively coupled to the scheduler 104, the memory 106, and the other resources 108. In optional embodiments, processing entity 302 and processing entity 304 are integrated into a single processing entity 305, such as where processing entity 302 and processing entity 304 are each hyperthreads and single processing entity 305 is a core or where processing entity 302 and processing entity 304 are each cores and single processing entity 305 is a processor. In some embodiments, the system 300 is component of an IMA system or an avionics computer.

As with system 100, in one embodiment the scheduler 304 is implemented as a separate piece of hardware or a piece of software running on the processing entity 302, the processing entity 304, or another processing entity resident on board or external to the system. As with system 100, the memory 106 is a physical memory storage device such as any form of permanent, semi-permanent, or temporary memory storage system or device. In some embodiments, the execution of the program instructions stored on memory 106 by processing entities 302 or 304 causes instantiation of at least one schedulable entity. As with system 100, the other resources 108 of the system 300 are any other resources that are directly or indirectly communicatively coupled to at least one of processing entity 302 and processing entity 304. The other resources 108 are configured to communicate with or be controlled by at least one of processing entity 302 and processing entity 304.

In the embodiment show in FIG. 3, scheduler 104 schedules schedulable entities onto at least one of the first processing entity 402 and the second processing entity 404 using CRMA scheduling to schedule schedulable entities in the schedulable windows of time 201 created by constraints on the execution timeline creating non-schedulable periods of time.

FIGS. 4A-4I are diagrams of an example constrained execution timeline diagram 400 in a constrained environment of the present invention, where schedulable windows of time 201 are constrained by non-schedulable windows of time 203 (represented with slashed lines). Each of FIGS. 4A-4I shows a different stage in the scheduling of schedulable entities for execution by a processing entity, from FIG. 4A where no schedulable entities have been scheduled for execution by one of the schedulable entities to FIG. 4I where a plurality of schedulable entities have been scheduled.

Figure 4A:
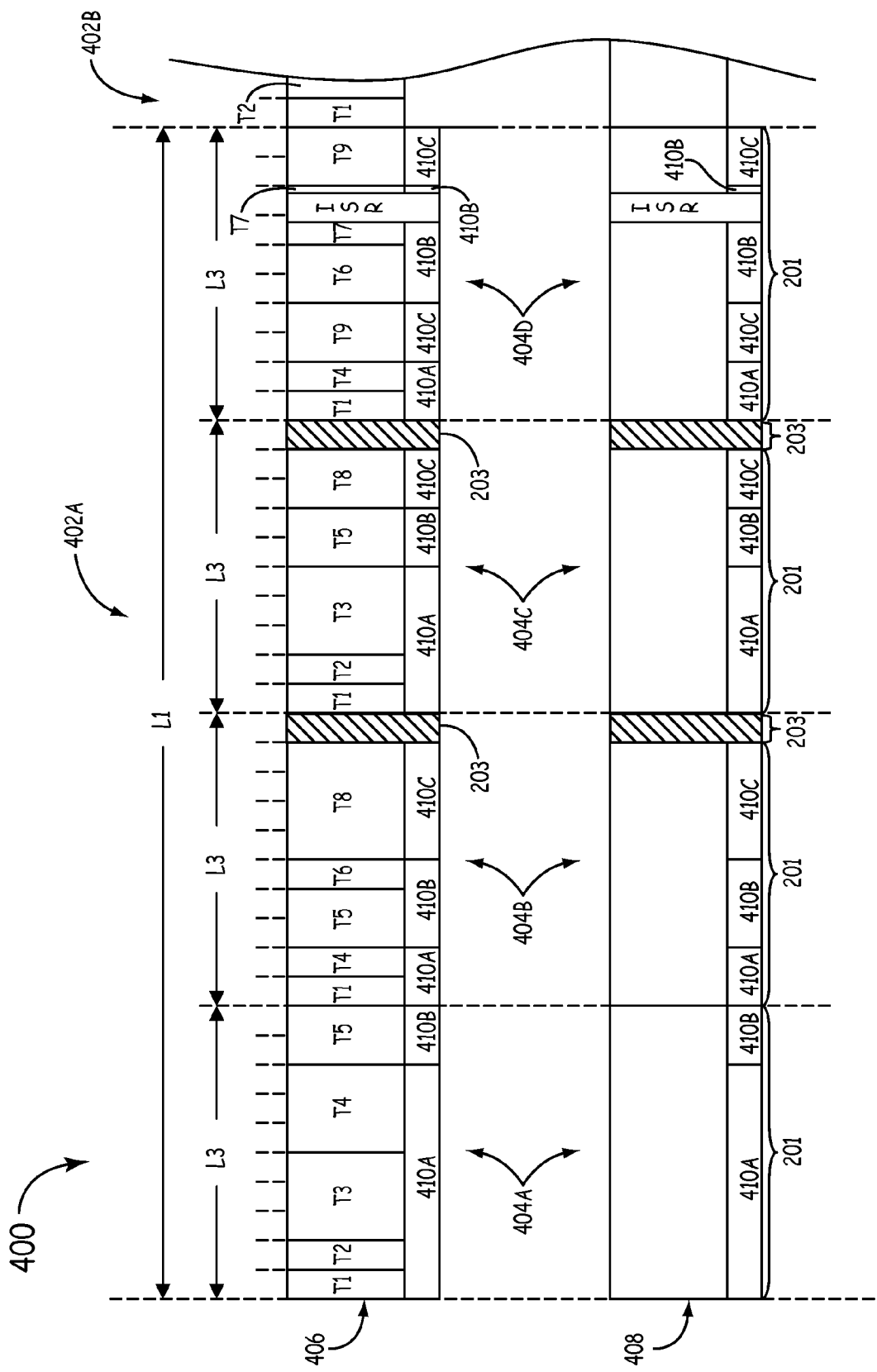
FIGS. 4A-4I are diagrams of an example constrained execution timeline in a constrained environment of the present invention.

FIG. 4A shows the example execution timeline diagram 400 in a constrained environment of the present invention without any schedulable entities scheduled on one of two execution timelines. As with execution timeline diagram 200, the execution timeline diagram 400 is divided up into major frames 402, such as major frame 402A and the portion of major frame 402B shown in FIG. 4A, and minor frames, such as minor frame 404A, minor frame 404B, minor frame 404C, and minor frame 404D shown in FIG. 4A. The execution timeline diagram 400 is the same as execution timeline diagram 200, except that it shows a fully scheduled execution timeline 406 for a master processing entity and an unscheduled execution timeline 408 for a slave processing entity. The master processing entity can be scheduled using various types of scheduling mechanisms, such as rate monotonic scheduling or constrained rate monotonic scheduling, though other types of scheduling can be used as well.

Scheduling on the unscheduled execution timeline 408 for the slave processing entity will be based on what has been scheduled on the scheduled execution timeline 406. Various constraints on the timeline can be implemented, as shown in FIGS. 4A-4I. For example, no schedulable entities will be able to execute on the slave processing entity unless something is executing on the master processing entity. Thus, there are non-schedulable windows of time 203 created on execution timeline 408 for the slave processing entity because no schedulable entities are scheduled on execution timeline 406 for the master processing entity.

In addition, in the embodiment shown in FIGS. 4A-4I, schedulable entities are placed into execution groups 410, such as execution groups 410A, 410B, and 410C. The execution groups 410 define which schedulable entities can be executing on a slave processing entity while other schedulable entities belonging to the same group are executing on the master processing entity. Thus, execution groups serve as another constraint on the timeline because only schedulable entities in the same execution group can be running on the master processing entity and the slave processing entity simultaneously.

While the embodiment shown in FIG. 4A includes four minor frames 404 in a single major frame 402, other implementations have different ratios of minor frames to major frames. It is understood that various implementations with different durations of major frame and minor frame can be implemented without departing from the scope of the claims described below. In addition, while FIG. 4A includes an execution timeline 406 for a master processing entity and only one other execution timeline 408 for a slave processing entity, other implementations include any number of additional execution timelines for additional slave processing entities that are also constrained by the execution timeline 406 for the master processing entity.

As described above, the schedulable entities have rates, periods, and budgets associated with them. The execution timelines 406 and 408 also have budget capacities that change as schedulable entities are scheduled onto the timelines. The scheduling of schedulable entities onto execution timeline 408 occurs according to the description above regarding the scheduling of schedulable entities onto execution timeline 204, where the execution timeline 408 of the slave processing entity (such as second processing entity 304) in example execution time line diagram 400 shown in FIG. 4A is constrained by the execution timeline 406 of the master processing entity (such as first processing entity 302). As described above, it is determined whether a schedulable entity is schedulable based on its rate (and thusly its period), and necessary budget. If a particular schedulable entity is not schedulable because there is not enough budget capacity available at the schedulable entity's rate, it still may be possible to schedule other schedulable entities at the same rate or slower rates.

In the implementation of the execution timeline diagram 400 shown in FIG. 4A, each major frame 402 has a duration D1 of 40 milliseconds and each minor frame 404 has a duration D3 of 10 milliseconds. The first minor frame 404A does not have any non-schedulable windows of time 201. The non-schedulable window of time 203 in the second minor frame 404B is one millisecond long. The non-schedulable window of time 203 in the third minor frame 404C is one millisecond long. The fourth minor frame 404D does not have any non-schedulable windows of time 203.

The execution timeline 406 for the master processing entity (such as first processing entity 302) has already been scheduled using a scheduler to schedule schedulable entities T1, T2, T3, T4, T5, T6, T7, T8, and T9 onto the execution timeline 406 in addition to an interrupt service request (ISR) that occurs in minor frame 404D, interrupting schedulable entity T7. In the example execution timeline diagram 400 shown in FIG. 4A, the ISR is treated as a schedulable entity having a higher priority than other schedulable entities and it is scheduled onto the execution timeline 408 for the slave processing entity (such as second processing entity 304) so that it will occur at the same time as the ISR on the execution timeline 406 for the master processing entity. The duration of the ISR is also taken into account when scheduling schedulable entities onto the execution timeline 408 for the slave processing entity. In the embodiment shown in FIG. 4A, the ISR is not a part of an execution group. Thus, schedulable entities cannot be scheduled on the slave processing entity (such as second processing entity 304) while ISR is running on the master processing entity (such as first processing entity 302). In some implementations, the ISR is treated as a non-schedulable window of time 203 for scheduling purposes. In some embodiments, the ISR is part of an execution group and is treated like other schedulable entities in the execution group.

FIGS. 4B-4I show the execution timeline 408 as it is being scheduled, where schedulable entity T11 is scheduled first, followed by schedulable entity T12, then schedulable entity T13, then schedulable entity T14, then schedulable entity T15, then schedulable entity T16, then schedulable entity T17, and finally schedulable entity T18. In other embodiments, the schedulable entities are scheduled in different orders. In the embodiments shown in FIGS. 4B-4E as described below, all the schedulable entities from execution group 410A being scheduled first, followed by all the schedulable entities from execution group 410B, followed by all the schedulable entities from execution group 410C. This order can be changed, so that they are scheduled in different orders.

Figure 4B:
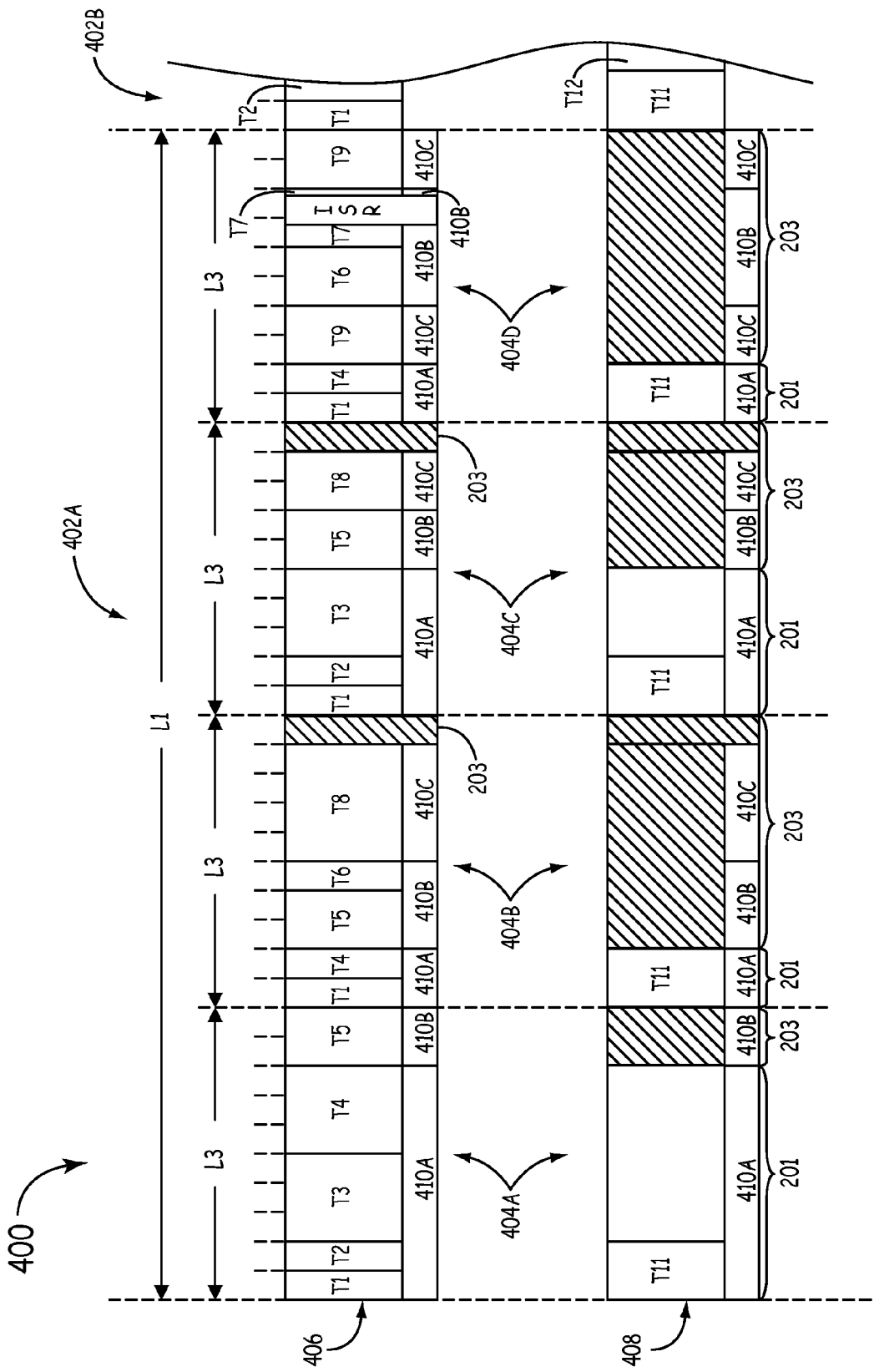
Figure 4C:
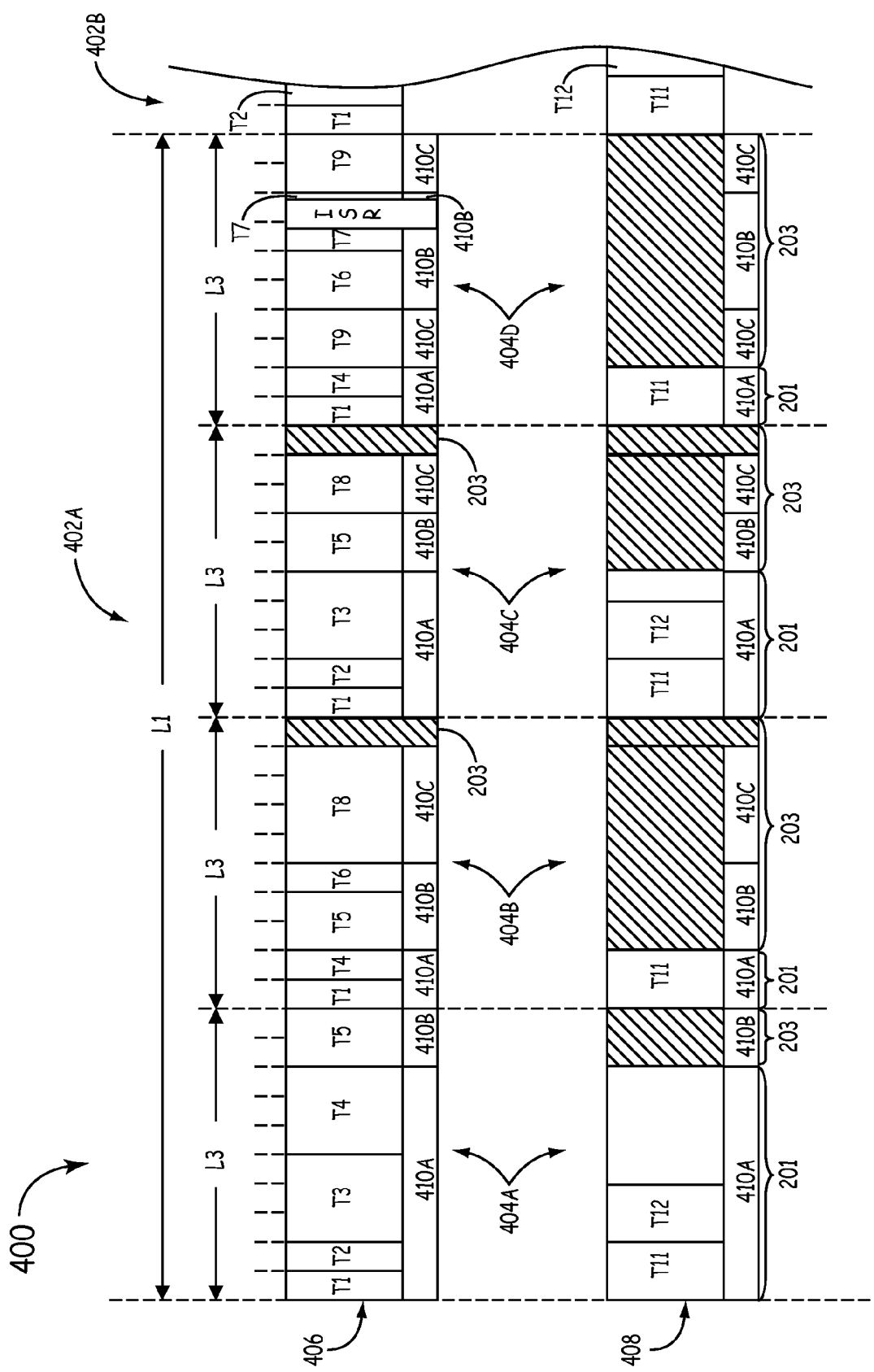
Figure 4D:
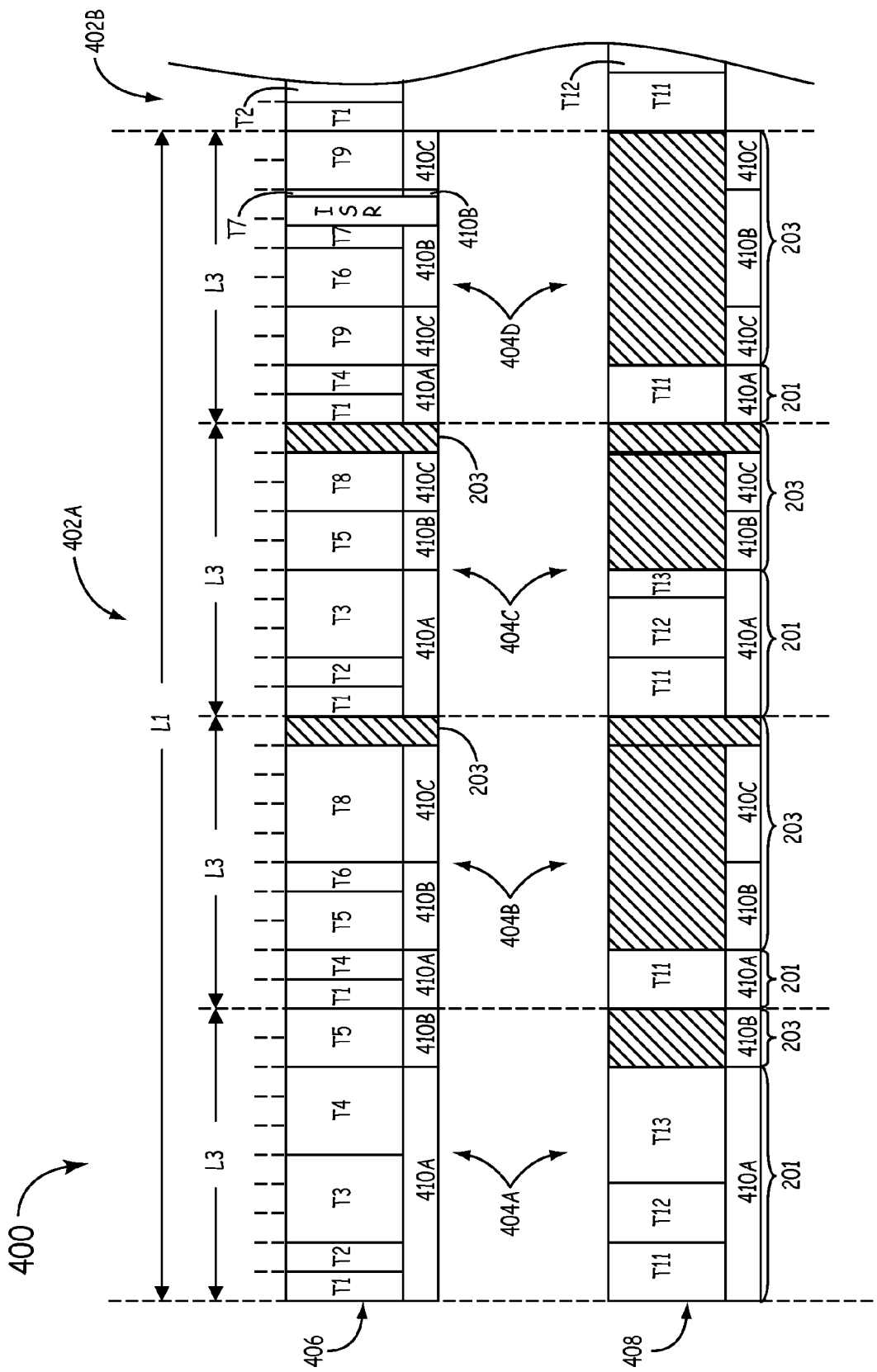

FIGS. 4B-4D are relevant for scheduling of schedulable entities T11, T12, and T13 belonging to the first execution group 410A. While schedulable entities belonging to the first execution group 410A are being scheduled, a CRMA domain is active that corresponds to the execution group 410A. The active CRMA domain only allows execution entities within the execution group 410A to be scheduled. Thus, time on the execution timeline allotted to other execution groups (such as execution groups 410B and 410C) is considered non-schedulable windows of time 203 for purposes of scheduling execution entities within the execution group 410A. Thus, FIG. 4B-4D shows that schedulable windows of time 201 are only during the active CRMA domain associated with the first execution group 410A and all other windows of time available on the timeline are non-schedulable windows of time 203.

FIG. 4B shows the execution timeline 408 for the slave processing entity (such as second processing entity 304) after schedulable entity T11 has been scheduled. Schedulable entity T11 has a rate of 100 Hz, a period of 10 milliseconds, and a budget of two milliseconds. Thus, if schedulable entity T11 is scheduled, it will execute every minor frame for two milliseconds. Thus, before any schedulable entities are scheduled onto the execution timeline 408 as shown in FIG. 2A, the schedulable entity T11 has a maximum guaranteed budget of two milliseconds because there are only two milliseconds available for scheduling schedulable entities in execution group 410A in the second minor frame 404C and the fourth minor frame 404D. Schedulable entity T11 only needed to use a budget of two milliseconds in each of the minor frames 404 and was thus schedulable and was scheduled as shown in FIG. 4B. While execution of schedulable entity T11 is scheduled at the beginning of each minor frame 404A, 404B, 404C, and 404D in FIG. 2B, in other implementations, the execution is spread through each minor frame 404. This may be the case if an asynchronous event (such as an interrupt service request) preempts execution of schedulable entity T11. After the interrupt service request is serviced, the execution of schedulable entity T11. While the CRMA scheduling guarantees that schedulable entity T11 will execute for a total of two milliseconds while the execution group 410A is active in each minor frame 404, it does not necessarily guarantee when, during each minor frame, schedulable entity T11 is scheduled.

FIG. 4C shows the execution timeline 408 for the slave processing entity (such as second processing entity 304) after schedulable entities T11 and T12 have been scheduled. Schedulable entity T12 has a rate of 50 Hz, a period of 20 milliseconds, and a budget of two milliseconds. Thus, if schedulable entity T12 is scheduled, it will execute for a total of two milliseconds during a period spanning two minor frames. Thus, if scheduled, schedulable entity T12 executes (1) during a first period spanning minor frames 206A and 206B for a total of two milliseconds (where the first period has a total duration of 20 milliseconds, which is two times the minor frame length L3=10 milliseconds); and (2) during a second period spanning minor frames 206C and 206D for a total of two milliseconds (where the second period has a total duration of 20 milliseconds, which is two times the minor frame length L3=10 milliseconds). Thus, after schedulable entity T11 is scheduled onto the constrained execution timeline 408 for the slave processing entity as shown in FIG. 4B, the schedulable entity T12 has a maximum guaranteed budget of three milliseconds available for scheduling schedulable entities in execution group 410A between the third minor frame 404C and the fourth minor frame 404D. Specifically, there are only three milliseconds available in the third minor frame 404C while execution group 410A is active and zero milliseconds available in the fourth minor frame 404D for a combined total of three milliseconds. Even though there are four milliseconds available between the first minor frame 404A (four milliseconds) and the second minor frame 404B (zero milliseconds), there is not four milliseconds available between the third minor frame 404C and the fourth minor frame 404D, and thus a four millisecond budget cannot be guaranteed at 50 Hz. Thus, only the three millisecond budget can be guaranteed at 50 Hz. Schedulable entity T12 only needed to use a budget of two milliseconds in each of its periods (the first spanning minor frames 404A and 404B and the second spanning minor frames 404C and 404D). Thus, schedulable entity T12 was schedulable and was scheduled as shown in FIG. 4C. As with execution of schedulable entity T11 above, the exact placement of execution of schedulable entity T12 within its period is not set and it does not necessarily need to come immediately after schedulable entity T11 and may be spread through its period.

FIG. 4D shows the execution timeline 408 for the slave processing entity (such as second processing entity 304) after schedulable entities T11, T12, and T13 have been scheduled. Schedulable entity T13 has a rate of 25 Hz, a period of 40 milliseconds, and a budget of five milliseconds. Thus, if schedulable entity T13 is scheduled, it will execute for a total of five milliseconds during a period spanning four minor frames. Thus, if scheduled, schedulable entity T13 executes during a first period spanning minor frames 404A, 404B, 404C, and 404D for a total of five milliseconds (where the period has a total duration of 40 milliseconds, which is four times the minor frame length L3=10 milliseconds and equal to the major frame length L1=40 milliseconds). Thus, after schedulable entities T11 and T12 are scheduled onto the constrained execution timeline 408 for the slave processing entity as shown in FIG. 4D, the schedulable entity T13 has a maximum guaranteed budget of five milliseconds because there are only five milliseconds available for scheduling schedulable entities in execution group 410A between the minor frames 404A, 404C, 404C, and 404D. Specifically, there are only four milliseconds available for scheduling schedulable entities in the execution group 410A in the first minor frame 404A, zero millisecond available in the second minor frame 404B, one millisecond available in the third minor frame 404C, and zero milliseconds available in the fourth minor frame 404D for a combined total of five milliseconds. Thus, only the five millisecond budget can be guaranteed at 25 Hz. Schedulable entity T13 only needed to use a budget of five milliseconds in each of its periods. Thus, schedulable entity T13 was schedulable and was scheduled as shown in FIG. 4D. While there is no available budget remaining for schedulable entities in the execution group 410A in the example shown in FIG. 4D, as with execution of schedulable entities T11 and T12 above, the exact placement of execution of schedulable entity T13 within its period is not set and it does not necessarily need to come immediately after schedulable entity T2 and may be spread through its period.

Figure 4E:
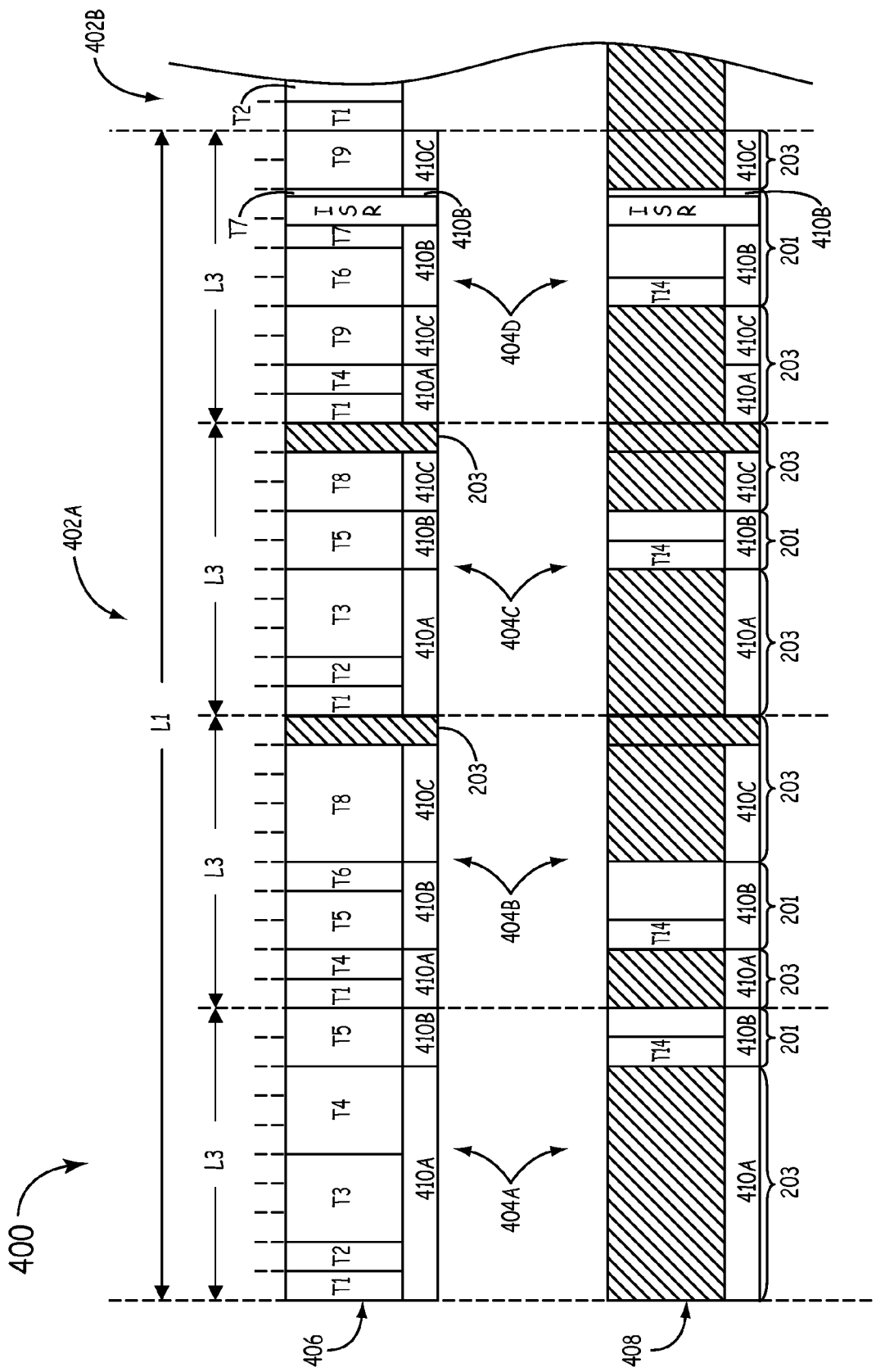
Figure 4F:
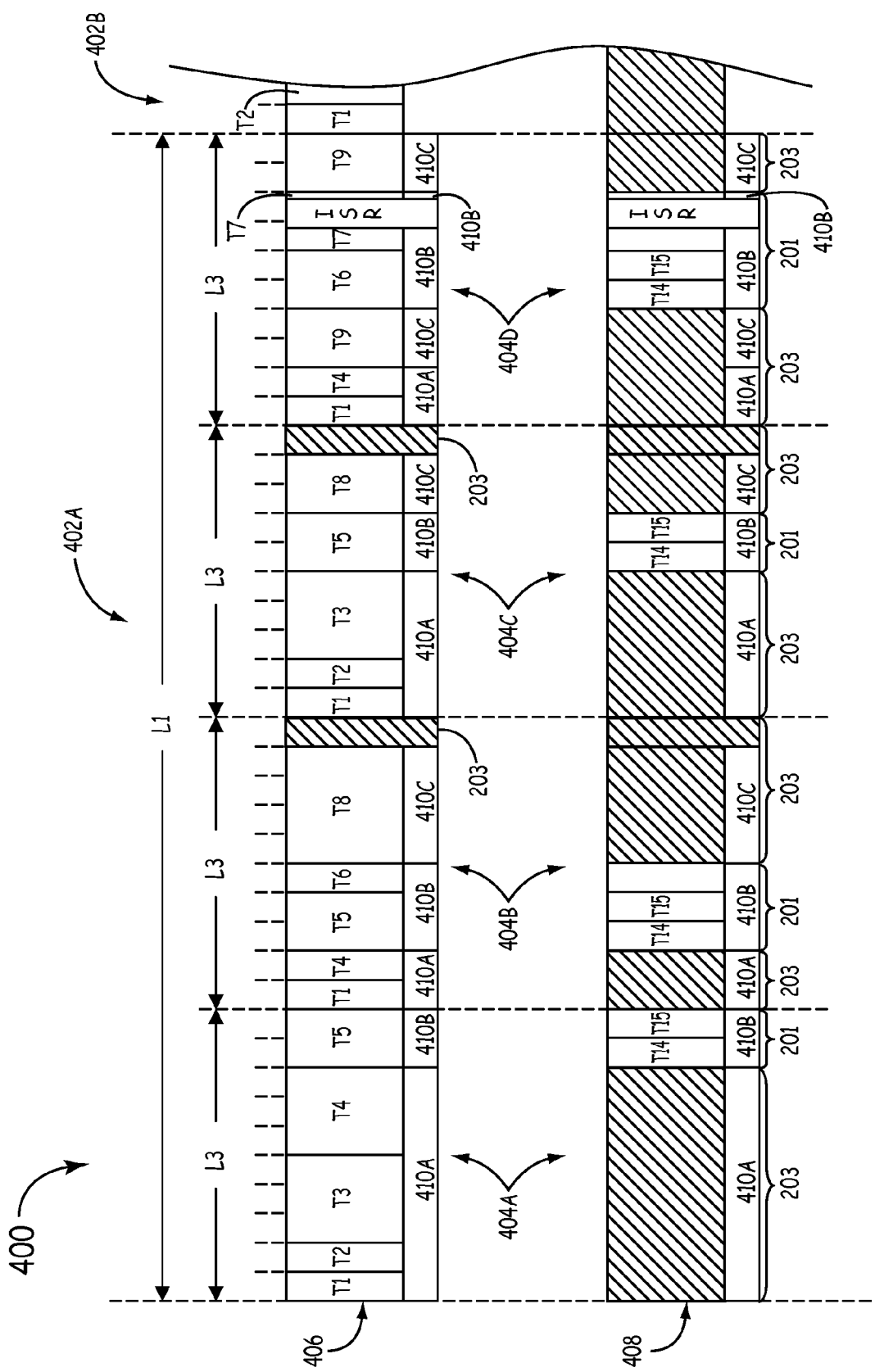
Figure 4G:
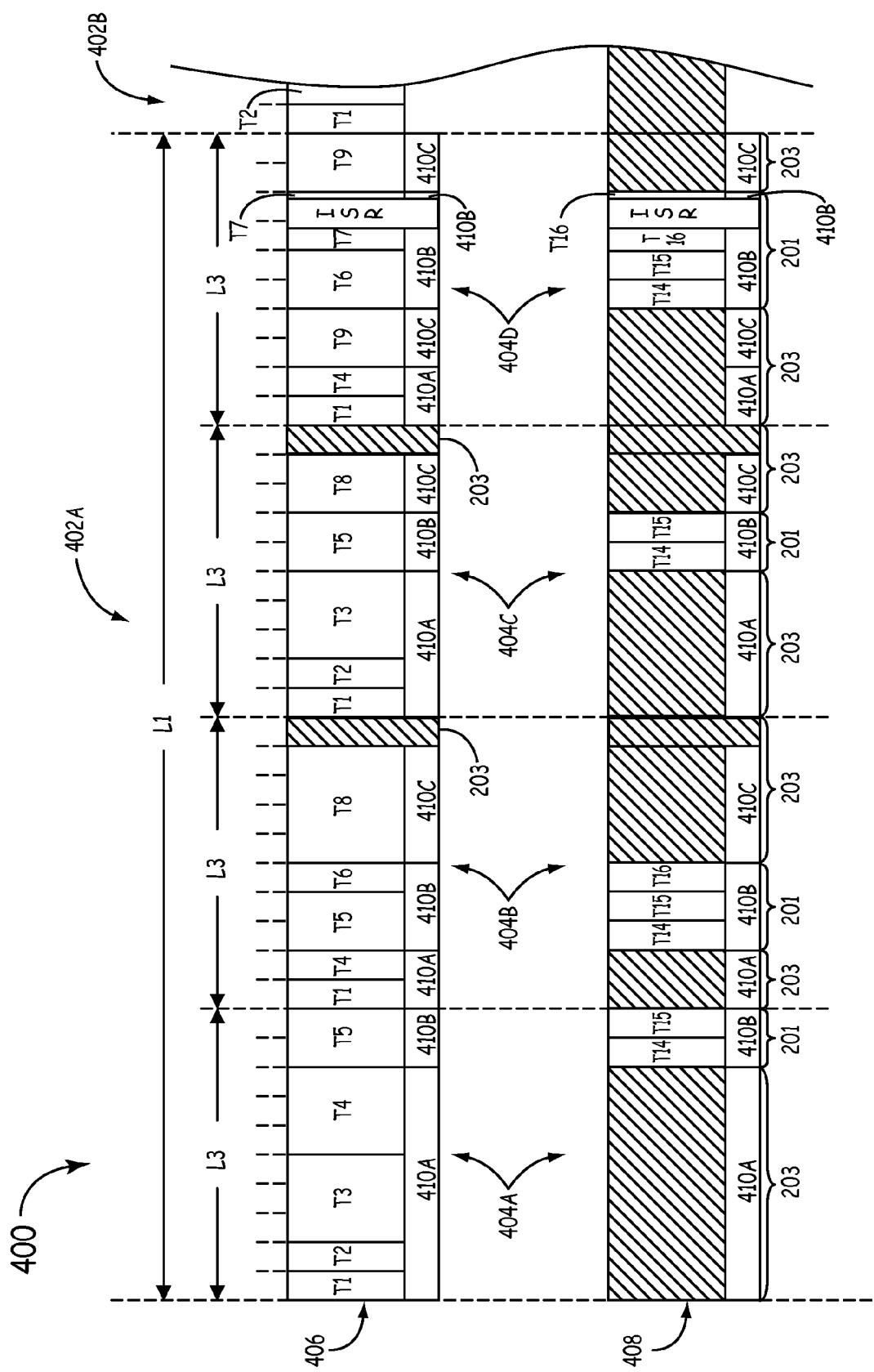

FIGS. 4E-4G are relevant for scheduling of schedulable entities T14, T15, and T16 belonging to the second execution group 410B. While schedulable entities belonging to the second execution group 410B are being scheduled, a CRMA domain is active that corresponds to the execution group 410B. The active CRMA domain only allows execution entities within the execution group 410B to be scheduled. Thus, time on the execution timeline allotted to other execution groups (such as execution groups 410A and 410C) is considered non-schedulable windows of time 203 for the purposes of scheduling execution entities within the execution group 410B. Thus, FIG. 4E-4G shows that schedulable windows of time 201 are only during the active CRMA domain associated with the first execution group 410B and all other windows of time available on the timeline are non-schedulable windows of time 203.

FIG. 4E shows the execution timeline 408 for the slave processing entity (such as second processing entity 304). Schedulable entity T14 has a rate of 100 Hz, a period of 10 milliseconds, and a budget of one millisecond. Thus, if schedulable entity T14 is scheduled, it will execute for a total of one millisecond during every minor frame. Thus, before any schedulable entities in the second execution group 410B are scheduled onto the execution timeline 408 as shown in FIG. 4E, the schedulable entity T14 has a maximum guaranteed budget of two milliseconds because there are only two milliseconds available for scheduling schedulable entities in execution group 410B in the first minor frame 404A and the third minor frame 404C. Schedulable entity T14 only needed to use a budget of one millisecond in each of the minor frames 404 and was thus schedulable and was scheduled as shown in FIG. 4E. While execution of schedulable entity T14 is scheduled at the beginning of each section during which the second execution group 410B is active on the master processing entity in each minor frame 404A, 404B, 404C, and 404D in FIG. 4E, in other implementations, the execution is spread through each minor frame 404 while execution group 410B is active on the master processing entity. This may be the case if an interrupt service request preempts execution of schedulable entity T14. After the interrupt service request is serviced, the execution of schedulable entity T14 resumes. While the CRMA scheduling guarantees that schedulable entity T14 will execute for a total of one millisecond while the execution group 410B is active in each minor frame 404, it does not necessarily guarantee when, during each minor frame, schedulable entity T14 is scheduled.

FIG. 4F shows the execution timeline 408 for the slave processing entity (such as second processing entity 304) after schedulable entity T14 has been scheduled. Schedulable entity T15 has a rate of 50 Hz, a period of 20 milliseconds, and a budget of two milliseconds. Thus, if schedulable entity T15 is scheduled, it will execute for a total of two milliseconds during a period spanning two minor frames. Thus, if scheduled, schedulable entity T15 executes (1) during a first frame period spanning minor frames 404A and 404B for a total of two milliseconds (where the first period has a total duration of 20 milliseconds, which is two times the minor frame length L3=10 milliseconds) and (2) during a second period spanning minor frames 404C and 404D for a total of two milliseconds (where the second period has a total duration of 20 milliseconds, which two times the minor frame length L3=10 milliseconds). Thus, after schedulable entity T15 is scheduled onto the constrained execution timeline 408 for the slave processing entity as shown in FIG. 4F, the schedulable entity T15 has a maximum guaranteed budget of three milliseconds available for scheduling schedulable entities in execution group 410B between the first minor frame 404A and the second minor frame 404B as well as between the third minor frame 404C and the fourth minor frame 404D. Specifically, there is one millisecond available in the first minor frame 404A while execution group 410 is active and two milliseconds available in the second minor frame 404B while execution group 410B is active for a combined total of three milliseconds. Similarly, there is one millisecond available in the third minor frame 404C while execution group 410B is active and two milliseconds available in the fourth minor frame 404D while execution group 410B is active for a combined total of three milliseconds. Thus, only the three millisecond budget can be guaranteed at 50 Hz. Schedulable entity T15 only needed to use a budget of two milliseconds in each of its periods (the first spanning minor frames 404A and 404B and the second spanning minor frames 404C and 404D). Thus, schedulable entity T15 was schedulable and was scheduled as shown in FIG. 4F. As with the other schedulable entities described above, the exact placement of execution of schedulable entity T15 within its period is not set and it does not necessarily need to come immediately after schedulable entity T14 and may be spread through its period. The placement of schedulable entity T15 will be constrained by when the execution group 410B is active.

FIG. 4G shows the execution timeline 408 for the slave processing entity (such as second processing entity 304) after schedulable entities T14 and T15 have been scheduled. Schedulable entity T16 has a rate of 25 Hz, a period of 40 milliseconds, and a budget of two milliseconds. Thus, if schedulable entity T16 is scheduled, it will execute for a total of two milliseconds during a period spanning four minor frames. Thus, if scheduled, schedulable entity T16 executes during a period spanning minor frames 404A, 404B, 404C and 404D for a total of two milliseconds (where the period has a total duration equal to four times the minor frame length L3=10 milliseconds and equal to the major frame length L1=40 milliseconds). Thus, after schedulable entities T14 and T15 are scheduled onto the constrained execution timeline 408 for the slave processing entity as shown in FIG. 4D, the schedulable entity T16 has a maximum guaranteed budget of two milliseconds because there are only two milliseconds available for scheduling schedulable entities in execution group 410B between the minor frames 404A, 404B, 404C, and 404D. Specifically, there is only one millisecond available in the second minor frame 404B and one millisecond available in the fourth minor frame 404D for scheduling schedulable entities in the execution group 410B, for a combined total of two milliseconds. Thus, only the two millisecond budget can be guaranteed at 25 Hz. Schedulable entity T16 only needed to use a budget of two milliseconds in its period. Thus, schedulable entity T16 was schedulable and was scheduled as shown in FIG. 4G. While there is no available budget remaining for schedulable entities in the execution group 410B in the example shown in FIG. 4G, as with execution of schedulable entities T14 and T15 above, the exact placement of execution of schedulable entity T16 within its period is not set and it does not necessarily need to come immediately after schedulable entity T14 or T15 and may be spread through its period.

Figure 4H:
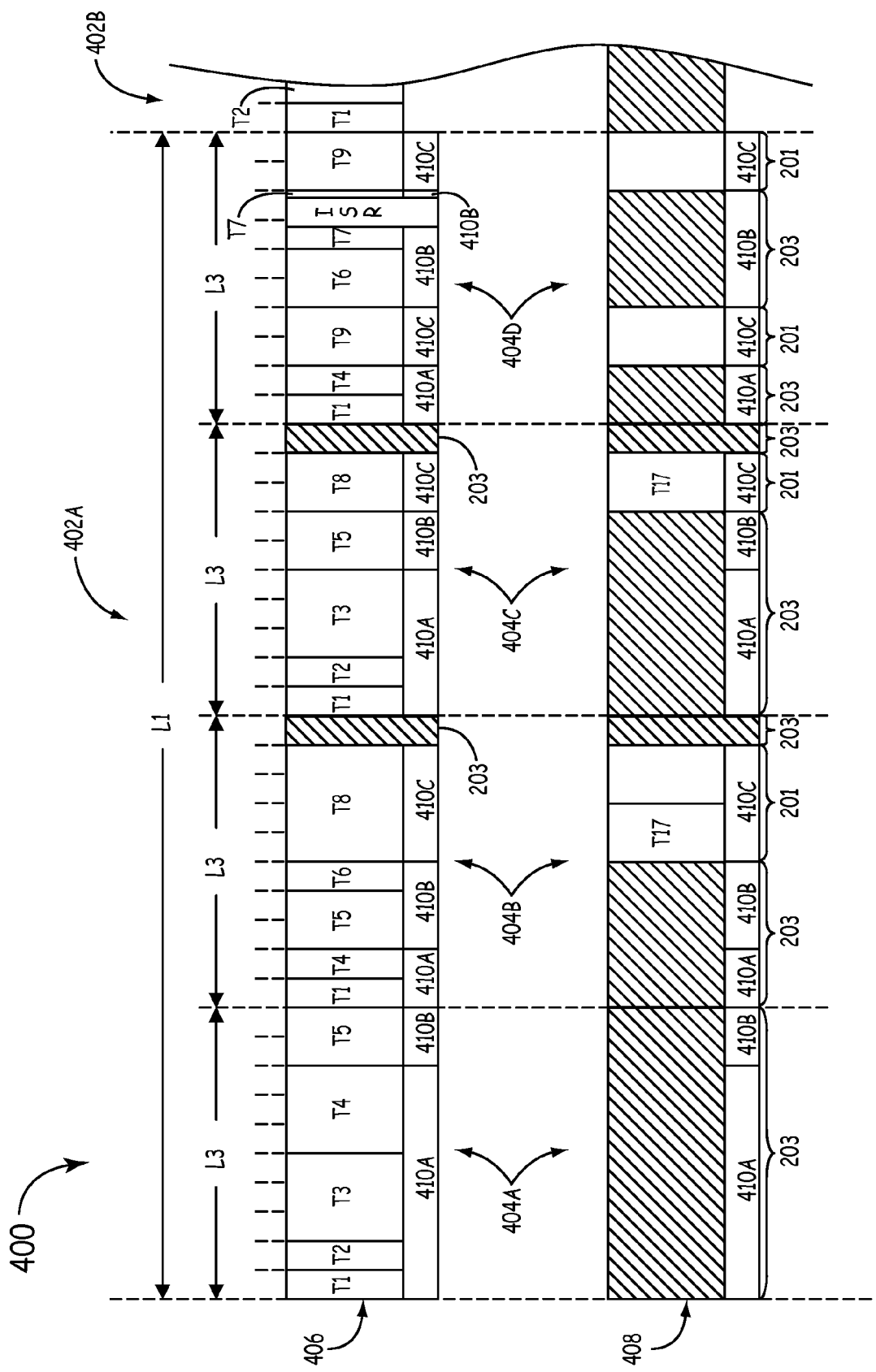
Figure 4I:
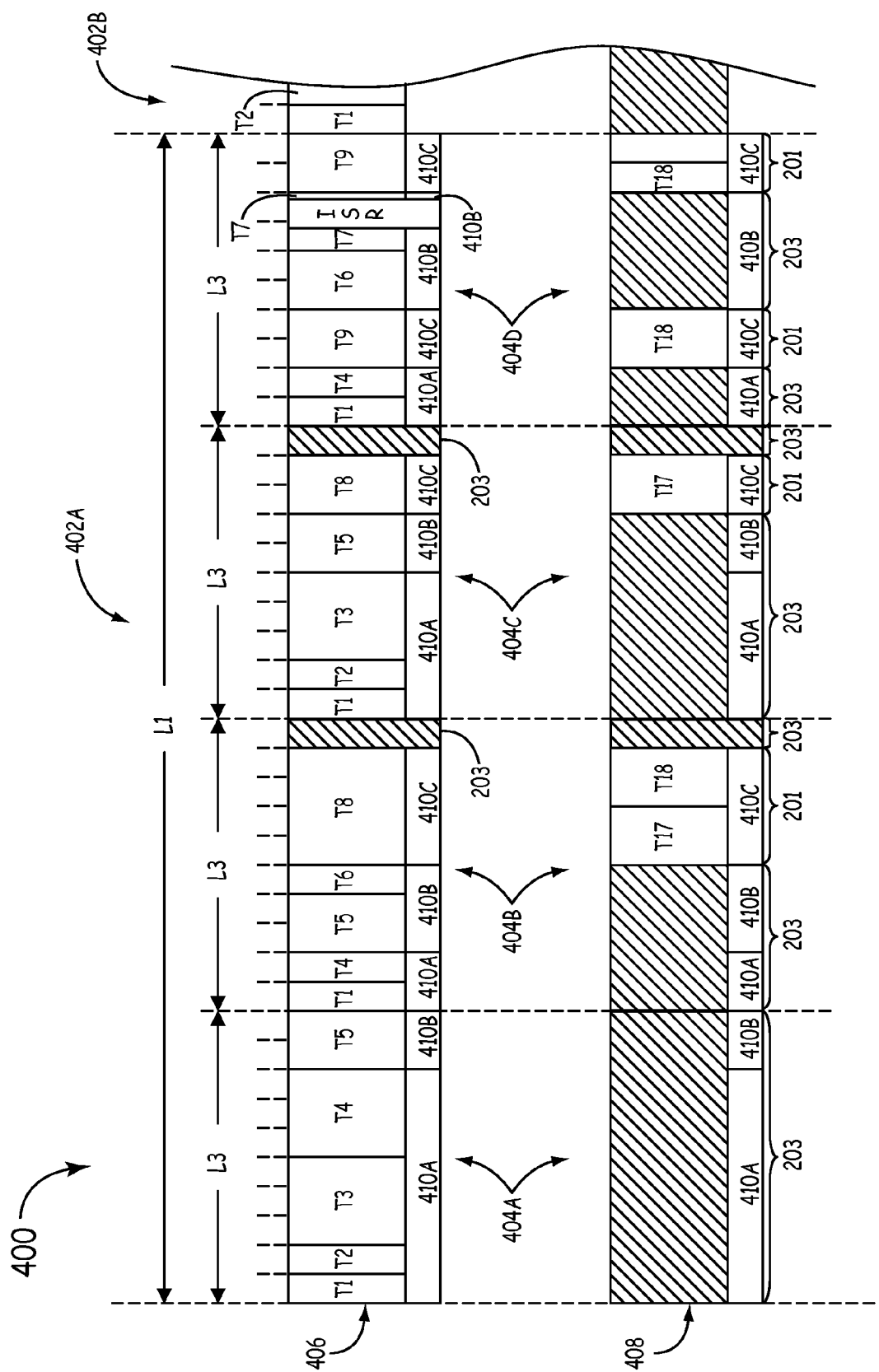

FIGS. 4H-4I illustrate scheduling of schedulable entities T17 and T18 belonging to the third execution group 410C. While schedulable entities belonging to the third execution group 410C are being scheduled, a CRMA domain is active that corresponds to the execution group 410C. The active CRMA domain only allows execution entities within the execution group 410C to be scheduled during the active CRMA domain. Thus, time on the execution timeline allotted to other execution groups (such as execution groups 410A and 410B) and other CRMA domains is considered non-schedulable windows of time 203 for purposes of scheduling execution entities within the execution group 410C. Thus, FIGS. 4H-4I shows that schedulable windows of time 201 are only during the active CRMA domain associated with the third execution group 410C and all other windows of time available on the timeline are non-schedulable windows of time 203.

FIG. 4H shows the execution timeline 408 for the slave processing entity (such as second processing entity 304). Schedulable entity T17 has a rate of 50 Hz, a period of 20 milliseconds, and a budget of 2 milliseconds. Thus, if schedulable entity T17 is scheduled, it will execute for a total of two milliseconds during a period spanning two minor frames. Thus, if scheduled, schedulable entity T17 executes (1) during a first period spanning minor frames 404A and 404B for a total of two milliseconds (where the first period has a total duration of 20 milliseconds, which is two times the minor frame length L3=10 milliseconds); and (2) during a second period spanning minor frames 404C and 404D for a total of two milliseconds (where the second period has a total duration of 20 milliseconds, which is two times the minor frame length L3=10 milliseconds). Thus, after schedulable entity T17 is scheduled onto the constrained execution timeline 408 for the slave processing entity as shown in FIG. 4H, the schedulable entity T17 has a maximum guaranteed budget of four milliseconds available for scheduling schedulable entities in execution group 410C between the first minor frame 404A and the second minor frame 404B. Specifically, there are four milliseconds available in the second minor frame 404B. Even though there are six milliseconds available between the third minor frame 404C and the fourth minor frame 404D, only four milliseconds are available in the first two minor frames and thus only four milliseconds can be guaranteed at the rate of 50 Hz. Schedulable entity T17 only needed to use a budget of two milliseconds in each of its periods (the first spanning minor frames 404A and 404B and the second spanning minor frames 404C and 404D). Thus, schedulable entity T17 was schedulable and was scheduled as shown in FIG. 4H. As with the other schedulable entities described above, the exact placement of schedulable entity T17 within its period is not set and it may be spread through its period. The placement of schedulable entity T17 will be constrained by when the execution group 410C is active.

FIG. 4I shows the execution timeline 408 for the slave processing entity (such as second processing entity 304) after schedulable entity T17 has been scheduled. Schedulable entity T18 has a rate of 25 Hz, a period of 40 milliseconds, and a budget of 5 milliseconds. Thus, if schedulable entity T18 is scheduled, it will execute for a total of five milliseconds during a period spanning four minor frames. Thus, if scheduled, schedulable entity T18 executes during a period spanning minor frames 404A, 404B, 404C, and 404D for a total of five milliseconds (where the period has a total duration equal to four times the minor frame length L3=10 milliseconds and equal to the major frame length L1=40 milliseconds). Thus, after schedulable entity T17 is scheduled onto the constrained execution timeline 408 for the slave processing entity as shown in FIG. 4I, the schedulable entity T18 has a maximum guaranteed budget of six milliseconds available for scheduling schedulable entities in execution group 410C between the first minor frame 404A, second minor frame 404B, third minor frame 404C, and fourth minor frame 404D. Specifically, there are two milliseconds available in the second minor frame 406B and four milliseconds available in the fourth minor frame 406D while execution group 410C is active for a combined total of six milliseconds. Thus, a six second budget can be guaranteed at 25 Hz. Schedulable entity T18 only needed to use a budget of five milliseconds in its period (spanning minor frames 404A, 404B, 404C, and 404D). Thus, schedulable entity T18 was schedulable and was scheduled as shown in FIG. 4I. As with the other schedulable entities described above, the exact placement of execution of schedulable entity T18 within its period is not set and it does not necessarily need to come immediately after schedulable entity T17 and may be spread throughout its period. The placement of schedulable entity T18 will be constrained by when the execution group 410C is active.

FIG. 4A-4I show a coherent example of scheduling schedulable entities on the execution timeline 408 on a slave processing entity (such as second processing entity 304) based on constraints created by the execution timeline 204 on a master processing entity (such as first processing entity 302). In other example implementations, certain schedulable entities may not be schedulable at a particular rate for a particular time budget. In these implementations, the scheduler may just move to another schedulable entity to see if it is schedulable or it may create an error condition indicating that the schedulable entity is not schedulable as desired. In some implementations, schedulable entities that are not schedulable in one major frame may be subsequently schedulable.

In some implementations, a schedulability analysis is performed before run-time to determine whether or not a particular set of schedulable entities are schedulable onto the constrained execution timeline 408. In some implementations, the schedule is predetermined before run-time and the schedulability analysis can be used to decide whether or not a particular set of schedulable entities configured at desired rates and time budgets is schedulable or not.

FIG. 5 is a flow chart illustrating a method 500 for performing the schedulabilty analysis of a current schedulable entity at a current rate onto an execution timeline in a constrained environment of the present invention. In alternate embodiments, the method 500 is implemented using any system having a schedulable entity to be scheduled onto an execution timeline of a processing entity, such as systems 100 and 300 described above. As such, alternatives disclosed with respect to this method apply to the embodiments described above with respect to FIGS. 1 and 3, and vice-versa.

The method 500 begins at 502 with determining the available capacity on the execution timeline for the processing entity based on constraints on the execution timeline over a plurality of time periods. In implementations where other schedulable entities have previously been scheduled onto the execution timeline, determining the available capacity is also based on the capacity utilized by the previously scheduled schedulable entities.

The method proceeds to 504 with determining whether enough available capacity exists to schedule a current schedulable entity a current budget at a current rate. When enough available capacity exists (checked at 504), the method 500 branches to 506 with scheduling the current schedulable entity onto the execution timeline for the processing entity at the current rate. The current schedulable entity is scheduled onto the execution timeline for the processing entity during a schedulable window of time where there is not a previously scheduled schedulable entity present.

After scheduling the current schedulable entity completes (at 506), the method 500 next proceeds to 508 with updating the available capacity to reflect the capacity utilized by the current schedulable entity at the current rate. Thus, subsequent scheduling of additional schedulable entities occurs based on the updated available capacity. The method next proceeds to 510, where it completes scheduling the current schedulable entity at the current rate.

When at 504, it is determined that enough available capacity does not exist to schedule the current schedulable entity with the current budget at the current rate, the method 500 branches from 504 to 510, with completing scheduling the current schedulable entity at the current rate. In other words, when there is not enough available capacity available to schedule the current schedulable entity with the current budget at the current rate, the method completes.

FIG. 6 is a flow chart illustrating a method 600 for performing a schedulabilty analysis for a set of multiple schedulable entities at multiple rates onto an execution timeline in a constrained environment of the present invention. In one embodiment, the method 600 incorporates method 500 of FIG. 5 and can be implemented using any system having schedulable entities to be scheduled onto an execution timeline of a processing entity, such as systems 100 and 300 described above. As such, alternatives disclosed with respect to this method apply to the embodiments described above with respect to FIGS. 1 and 3, and vice-versa.

The method 600 begins at 602 with setting the current rate to the fastest rate of any schedulable entity available for scheduling. The method next proceeds to 604 with setting the current schedulable entity as a first schedulable entity at the current rate. In some implementations, the first schedulable entity is randomly selected from all the schedulable entities having the current rate. In some implementations, the first schedulable entity is selected based on some prioritization of schedulable entities having the current rate. In some implementations, at least some of the schedulable entities having the current rate have defined execution ordering requirements (such as a schedule-before relationships) with one another indicating that one will be scheduled before another.

The method next proceeds to 606, with scheduling the current schedulable entity. In some implementations, this occurs according to method 500 described above. In other implementations, the scheduling occurs in other ways. The method next proceeds to 608, with determining whether any additional schedulable entities have not been scheduled at the current rate. When it is determined that there are additional schedulable entities available at the current rate, the method 600 branches to 610, with setting the current schedulable entity as the next schedulable entity at the current rate. As before, the next schedulable entity may be chosen randomly from the set of schedulable entities at the current rate in some implementations or there may be some sort of prioritization between the set of schedulable entities at the current rate, where some are scheduled before others. The method next returns to 606, with scheduling the current schedulable entity.

When at 608, it is determined that there are no additional schedulable entities at the current rate, the method 600 branches to 612, with determining whether the current rate is the slowest rate. When the current rate is not the slowest rate, the method 600 branches to 614, with setting the current rate to a next rate slower. In some implementations, the current rate is only set to rates that have schedulable entities. The method next returns to 604, setting the schedulable entity as the first schedulable entity at the current rate and proceeds as outlined above.

When at 612, it is determined that the current rate is the slowest rate, the method 600 branches to 616, where the scheduling is complete. In other implementations, the method 600 is implemented with different ordering between steps and the order shown in FIG. 6 and described above is merely exemplary and should not be taken as limiting.

While this specification and accompanying figures refer to period durations and schedulable entity execution duration in milliseconds, it is understood that in some embodiments both the period duration and the schedulable entity execution duration can be longer or shorter, including fractions of milliseconds. Whole millisecond values are only used for clarity and are not intended to limit any of the embodiments of the invention. Also, while the specification and accompanying figures show embodiments where execution group activity and execution of schedulable entities occur in solid blocks of time, it is understood that in some embodiments the execution and scheduling of schedulable entities is not in solid blocks of time, nor are the execution groups active in solid blocks time. The solid blocks of time are shown for clarity and are not intended to limit any of the embodiments of the invention. For example, in some embodiments, a single execution group may be switched in and out multiple times during a minor frame based on changes in which schedulable entity is actively running on a master processing entity.

Several means are available to implement the systems and methods of the current invention as discussed in this specification. These means include, but are not limited to, digital computer systems, microprocessors, general purpose computers, programmable controllers and field programmable gate arrays (FPGAs) or application-specific integrated circuits (ASICs). Therefore other embodiments of the present invention are program instructions resident on computer readable media which when implemented by such means enable them to implement embodiments of the present invention. Computer readable media include any form of a physical computer memory storage device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for applying constrained rate monotonic scheduling to schedule a first schedulable entity onto an execution timeline for a first processing entity in a constrained environment, the execution timeline having both schedulable windows of time and non-schedulable windows of time based on constraints placed on the execution timeline, the method comprising:
   determining available capacity at a rate of the first schedulable entity on the execution timeline for the first processing entity based on the constraints placed on the execution timeline over a plurality of time periods, wherein schedulable entities can only be scheduled onto the execution timeline during the schedulable windows of time that are not precluded by the constraints, wherein the schedulable entities cannot be scheduled onto the execution timeline during the non-schedulable windows of time that are precluded by the constraints placed on the execution timeline, wherein neither previously scheduled schedulable entities nor overhead are constraints placed on the execution timeline;
   determining whether enough available capacity at the rate of the first schedulable entity exists to schedule the first schedulable entity with a first budget at the rate onto the execution timeline; and
   when enough available capacity at the rate of the first schedulable entity exists to schedule the first schedulable entity with the first budget at the rate, scheduling the first schedulable entity onto the execution timeline for the first processing entity during a first schedulable window of time;
   when the first schedulable entity is scheduled onto the execution timeline, updating the available capacity at each of a plurality of rates including the rate to reflect the capacity utilized by the first schedulable entity at the rate, wherein the available capacity at two of the plurality of rates is different.

2. The method of claim 1, wherein the available capacity at the rate is less than the available capacity at another rate that is slower than the rate.

3. The method of claim 1, wherein the first processing entity is a slave processing entity associated with a master processing entity; and
   wherein the schedulable windows of time correspond to times during which schedulable entities are executing on the master processing entity.

4. The method of claim 3, wherein the master processing entity and the slave processing entity each comprise at least one of a processor, a core, and a hyperthread.

5. The method of claim 1, wherein the constraints placed on the execution timeline are created by time partitioning two separate operating systems running on a single processing entity.

6. The method of claim 5, wherein the single processing entity comprises at least one of a processor, a core, and a hyperthread.

7. The method of claim 1, further comprising:
   determining available capacity at the rate of the first schedulable entity on the execution timeline for the first processing entity based on the constraints placed on the execution timeline over a plurality of time periods and the capacity utilized by the first schedulable entity;
   determining whether enough available capacity at another rate of a second schedulable entity exists to schedule the second schedulable entity with a second budget at another rate onto the execution timeline;

when enough available capacity at the another rate of the second schedulable entity exists to schedule the second schedulable entity with the second budget at the another rate, scheduling the second schedulable entity onto the execution timeline for the first processing entity during a second schedulable window of time; and when the second schedulable entity is scheduled onto the execution timeline, updating the available capacity at each of the plurality of rates including the rate and the another rate to reflect the capacity utilized by the second schedulable entity.

8. The method of claim 7, wherein the first rate is faster than the second rate;

wherein the available capacity at the first rate is less than the available capacity at the second rate; and wherein determining whether enough available capacity exists to schedule the second schedulable entity at the second budget at the second rate occurs after determining whether enough available capacity exists to schedule the first schedulable entity at the first budget at the first rate.

9. A system for applying constrained rate monotonic scheduling to schedule a first schedulable entity onto at least one execution timeline for a first processing entity in a constrained environment, the at least one execution timeline having both first schedulable windows of time and first non-schedulable windows of time based on constraints placed on the execution timeline, the system comprising:

a first processing entity configured to execute first program instructions contained in a first plurality of schedulable entities, wherein the first processing entity comprises at least one of a processor, a core, and a hyperthread of a hyperthreaded processor; and a first scheduler configured to schedule the execution of the first plurality of schedulable entities on the first processing entity, wherein the first scheduler:

determines the available capacity at a rate of the first schedulable entity on a first execution timeline for the first processing entity based on constraints placed on the first execution timeline over a first plurality of time periods, wherein schedulable entities can only be scheduled onto the first execution timeline during the first schedulable windows of time that are not precluded by constraints, wherein the schedulable entities cannot be scheduled onto the execution timeline during the first non-schedulable windows of time that are precluded by the constraints placed on the execution timeline, wherein neither previously scheduled schedulable entities nor overhead are constraints placed on the execution timeline;

determines when enough available capacity at the rate of the first schedulable entity exists to schedule the first schedulable entity with a first budget at the rate onto the first execution timeline of the first processing entity;

when enough available capacity at the rate of the first schedulable entity exists to schedule the first schedulable entity with the first budget at the rate onto the first execution timeline of the first processing entity, schedules the first schedulable entity onto the first execution timeline for the first processing entity during a first schedulable window of time; and when the first schedulable entity is scheduled onto the first execution timeline, updates the first available capacity at each of a first plurality of rates including the rate to reflect capacity utilized by the first schedulable entity at the rate, wherein the available capacity at two of the plurality of rates is different.

10. The system of claim 9, wherein the available capacity at the rate is less than the available capacity at another rate that is slower than the rate.

11. The system of claim 9, further comprising:

a second processing entity configured to execute program instructions contained in a second plurality of schedulable entities; and a second scheduler configured to schedule the execution of the second plurality of schedulable entities on the second processing entity using a second execution timeline, wherein the second scheduler:

determines available capacity at another rate of a second schedulable entity on the second execution timeline for the second processing entity based on second constraints placed on the second execution timeline over a second plurality of time periods, wherein the schedulable entities can only be scheduled onto the second execution timeline during second schedulable windows of time that are not precluded by the second constraints, wherein the schedulable entities cannot be scheduled onto the second execution timeline during second non-schedulable windows of time that are precluded by the second constraints;

determines when enough available capacity at the another rate of the second schedulable entity exists to schedule the second schedulable entity with a second budget at the another rate onto the second execution timeline of the second processing entity;

when enough available capacity at the another rate of the second schedulable entity exists to schedule the second schedulable entity with the second budget at the another rate onto the second execution timeline of the second processing entity, schedules the second schedulable entity onto the second execution timeline of the second processing entity during a second schedulable window of time; and when the second schedulable entity is scheduled onto the second execution timeline of the second processing entity, updates second available capacity at each of a second plurality of rates including the another rate to reflect capacity utilized by the second schedulable entity at the another rate.

12. The system of claim 11, wherein the second processing entity comprises at least one of a processor, a core, and a hyperthread.

13. The system of claim 9, wherein the first processing unit is further configured to execute program instructions contained in a second plurality of schedulable entities; and wherein a second scheduler is configured to schedule the execution of the second plurality of schedulable entities on the first processing entity using a second execution timeline, wherein the second scheduler:

determines available capacity at another rate of a second schedulable entity on the second execution timeline for the first processing entity based on second constraints placed on the second execution timeline over a second plurality of time periods, wherein the schedulable entities can only be scheduled onto the second execution timeline during second schedulable windows of time that are not precluded by the second constraints, wherein the schedulable entities cannot be scheduled onto the second execution timeline during second non-schedulable windows of time that are precluded by the second constraints;
determines when enough available capacity at the another rate of the second schedulable entity exists to schedule the second schedulable entity with a second budget at the another rate onto the second execution timeline of the first processing entity;
when enough available capacity at the another rate of the second schedulable entity exists to schedule the second schedulable entity with the second budget at the another rate onto the second execution timeline of the first processing entity, schedules the second schedulable entity onto the second execution timeline of the first processing entity during a second schedulable window of time; and
when the second schedulable entity is scheduled onto the second execution timeline of the first processing entity, updates second available capacity at each of a second plurality of rates including the another rate to reflect capacity utilized by the second schedulable entity at the another rate.

14. The system of claim 13, wherein the first set of schedulable windows of time in the first timeline and the second set of schedulable windows of time in the second timeline are mutually exclusive.

15. The method of claim 13, wherein the first plurality of schedulable entities and the first execution timeline are associated with a first operating system running on the first processing entity; and
wherein the second plurality of schedulable entities and the second execution timeline are associated with a second operating system running on the first processing entity.

16. An avionics system comprising:
a first avionics computer configured for applying constrained rate monotonic scheduling to schedule a first schedulable entity onto at least a first execution timeline for a first processing entity in a constrained environment, the execution timeline having both first schedulable windows of time and first non-schedulable windows of time based on constraints placed on the execution timeline, the first avionics computer having:
a first processing entity configured to execute first program instructions contained in a first plurality of schedulable entities; and
a first scheduler configured to schedule the execution of the first plurality of schedulable entities on the first processing entity, wherein the first scheduler:
determines the available capacity at a rate of the first schedulable entity on a first execution timeline for the first processing entity based on constraints placed on the first execution timeline over a first plurality of time periods, wherein schedulable entities can only be scheduled onto the first execution timeline during the first schedulable windows of time that are not precluded by constraints, wherein the schedulable entities cannot be scheduled onto the execution timeline during the first non-schedulable windows of time that are precluded by the constraints placed on the execution timeline, wherein neither previously scheduled schedulable entities nor overhead are constraints placed on the execution timeline;
determines when enough available capacity at the rate of the first schedulable entity exists to schedule the first schedulable entity with a first budget at the rate onto the first execution timeline of the first processing entity;
when enough available capacity at the rate of the first schedulable entity exists to schedule the first schedulable entity with the first budget at the rate onto the first execution timeline of the first processing entity, schedules the first schedulable entity onto the first execution timeline for the first processing entity during a first schedulable window of time; and
when the first schedulable entity is scheduled onto the first execution timeline, updates the first available capacity at each of a first plurality of rates including the rate to reflect capacity utilized by the first schedulable entity at the rate, wherein the available capacity at two of the plurality of rates is different.

17. The system of claim 16, wherein the first avionics computer further includes:
a second processing entity configured to execute program instructions contained in a second plurality of schedulable entities; and
a second scheduler configured to schedule the execution of the second plurality of schedulable entities on the second processing entity using a second execution timeline, wherein the second scheduler:
determines available capacity at another rate of a second schedulable entity on the second execution timeline for the second processing entity based on second constraints placed on the second execution timeline over a second plurality of time periods, wherein the schedulable entities can only be scheduled onto the second execution timeline during second schedulable windows of time that are not precluded by the second constraints, wherein the schedulable entities cannot be scheduled onto the second execution timeline during second non-schedulable windows of time that are precluded by the second constraints;
determines when enough available capacity at the another rate of the second schedulable entity exists to schedule the second schedulable entity with a second budget at the another rate onto the second execution timeline of the second processing entity;
when enough available capacity at the another rate of the second schedulable entity exists to schedule the second schedulable entity with the second budget at the another rate onto the second execution timeline of the second processing entity, schedules the second schedulable entity onto the second execution timeline of the second processing entity during a second schedulable window of time; and
when the second schedulable entity is scheduled onto the second execution timeline of the second processing entity, updates second available capacity at each of a second plurality of rates including the another rate to reflect capacity utilized by the second schedulable entity at the another rate.

18. The system of claim 16, wherein the first processing unit is further configured to execute program instructions contained in a second plurality of schedulable entities; and
wherein a second scheduler is configured to schedule the execution of the second plurality of schedulable entities on the first processing entity using a second execution timeline, wherein the second scheduler:
determines available capacity at another rate of a second schedulable entity on the second execution timeline for the first processing entity based on second constraints placed on the second execution timeline over a second plurality of time periods, wherein the schedulable entities can only be scheduled onto the second execution timeline during second schedulable windows of time that are not precluded by the second constraints, wherein the schedulable entities cannot be scheduled onto the second execution timeline during second non-schedulable windows of time that are precluded by the second constraints;

determines when enough available capacity at the another rate of the second schedulable entity exists to schedule the second schedulable entity with a second budget at the another rate onto the second execution timeline of the first processing entity;

when enough available capacity at the another rate of the second schedulable entity exists to schedule the second schedulable entity with the second budget at the another rate onto the second execution timeline of the first processing entity, schedules the second schedulable entity onto the second execution timeline of the first processing entity during a second schedulable window of time; and when the second schedulable entity is scheduled onto the second execution timeline of the first processing entity, updates second available capacity at each of a second plurality of rates including the another rate to reflect capacity utilized by the second schedulable entity at the another rate.

19. The method of claim 18, wherein the first plurality of schedulable entities and the first execution timeline are associated with a first operating system running on the first processing entity;

wherein the second plurality of schedulable entities and the second execution timeline are associated with a second operating system running on the first processing entity; and wherein a hypervisor allocates time between the first operating system and the second operating system.

\* \* \* \* \*